(12) United States Patent
Andriolo

(10) Patent No.: US 12,535,819 B2
(45) Date of Patent: Jan. 27, 2026

(54) SELF-MOVING DEVICE, MOVING TRAJECTORY ADJUSTING METHOD, AND COMPUTER-READABLE STORAGE MEDIUM

(71) Applicant: Positec Power Tools (Suzhou) Co., Ltd, Jiangsu (CN)

(72) Inventor: Paolo Andriolo, Vicenza (IT)

(73) Assignee: Positec Power Tools (Suzhou) Co., LTD., Suzhou (CN)

( * ) Notice: Subject to any disclaimer, the term of this patent is extended or adjusted under 35 U.S.C. 154(b) by 150 days.

(21) Appl. No.: 18/382,306

(22) Filed: Oct. 20, 2023

(65) Prior Publication Data

US 2024/0053760 A1  Feb. 15, 2024

Related U.S. Application Data

(63) Continuation of application No. PCT/CN2022/088456, filed on Apr. 22, 2022.

(30) Foreign Application Priority Data

Apr. 22, 2021 (CN) .......................... 202110436777.2

(51) Int. Cl.
G05D 1/00 (2006.01)
(52) U.S. Cl.
CPC ......... G05D 1/0246 (2013.01); G05D 1/0274 (2013.01)
(58) Field of Classification Search
CPC ........................... G05D 1/0246; G05D 1/0274
See application file for complete search history.

(56) References Cited

U.S. PATENT DOCUMENTS

| 4,858,752 A | 8/1989 | Ballard, Jr. |
| 12,213,402 B2* | 2/2025 | Mårtensson ......... G05D 1/0214 |
| 2018/0160619 A1 | 6/2018 | Manji et al. |
| 2019/0235490 A1* | 8/2019 | Tsusaka ............... G05D 1/0016 |
| 2019/0325593 A1* | 10/2019 | Tokimitsu .............. G01B 11/25 |
| 2020/0225673 A1* | 7/2020 | Ebrahimi Afrouzi ........................ A47L 11/4011 |

(Continued)

FOREIGN PATENT DOCUMENTS

| CN | 102759924 | 10/2012 |
| CN | 102759924 A | 10/2012 |

(Continued)

OTHER PUBLICATIONS

Translation of CN114881853-A, Aug. 9, 2022.*

(Continued)

*Primary Examiner* — Fadey S. Jabr
(74) *Attorney, Agent, or Firm* — Lee & Hayes, P.C.

(57) ABSTRACT

This application discloses a self-moving device, a method for adjusting a movement trajectory. The device includes a body, an image acquisition module, and a control circuit. The image acquisition module acquires an image in a traveling direction of the body. The control circuit fits, according to the image, a boundary corresponding to a working region in which the self-moving device is located. In response to the body moves toward the boundary and the body and the boundary meet a preset distance relationship, an angle relationship between the traveling direction of the body and the boundary is recognized according to the image, and the body is controlled to steer.

19 Claims, 11 Drawing Sheets

(56) References Cited

U.S. PATENT DOCUMENTS

2021/0018927 A1    1/2021    Ackerman et al.
2021/0100160 A1    4/2021    Kang et al.

FOREIGN PATENT DOCUMENTS

| CN | 107368079   |   | 11/2017 |             |
|----|-------------|---|---------|-------------|
| CN | 107402573 A | * | 11/2017 | ............ G05D 1/247 |
| CN | 107608341 A |   | 1/2018  |             |
| CN | 108247647 A |   | 7/2018  |             |
| CN | 110774283   |   | 2/2020  |             |
| CN | 110801180 A | * | 2/2020  | ............ A47L 11/24 |
| CN | 113064408 A | * | 7/2021  | ........... G05D 1/0223 |
| CN | 114881853 A | * | 8/2022  |             |
| EP | 3760022     |   | 1/2021  |             |
| JP | 2016114984 A |  | 6/2016  |             |

OTHER PUBLICATIONS

First Chinese Office Action for related Chinese Patent Application No. 202210427365.7, dated Oct. 26, 2024, 13 pages.
First Chinese Search Report for related Chinese Patent Application No. 202210427365.7, dated Oct. 26, 2024, 1 page.
European Search Report for related European Patent Application No. 22791128.6, dated Jan. 15, 2025, 7 pages.
Translated PCT Written Opinion for related PCT No. PCT/CN2022/088456, dated Jul. 26, 2022, 5 pages.
Supplemental EP Search Report for related EP Patent Application No. 22791128, dated Dec. 23, 2024, 2 pages.

\* cited by examiner

SELF-MOVING DEVICE, MOVING TRAJECTORY ADJUSTING METHOD, AND COMPUTER-READABLE STORAGE MEDIUM

CROSS-REFERENCE TO RELATED APPLICATION

This application is a Continuation Bypass of International Application No. PCT/CN2022/088456, filed on Apr. 22, 2022, which claims benefit of and priority to Chinese Patent Application No. 202110436777.2, filed on Apr. 22, 2021, all of which are hereby incorporated by reference in their entirety for all purposes as if fully set forth herein.

TECHNICAL FIELD

The present invention relates to the field of automation technologies, and in particular, to a self-moving device, a method for adjusting a movement trajectory, and a computer readable storage medium.

BACKGROUND

As people's lifestyle becomes increasingly fast, self-moving devices are applied increasingly widely all over the world. The self-moving devices are, for example, an autonomous vacuum cleaner, an autonomous mopping device, and the like for room cleaning and an autonomous lawn-mower and the like for gardening. The self-moving devices have automatic working procedures and can work autonomously, and therefore do not require continuous manipulation by users. Therefore, people can be freed from heavy household or working tasks, so that a lot of effort and time are saved.

People have increasingly higher requirements for self-moving devices. This poses great challenge to function requirements of self-moving devices. A path planning technology is one of the key technologies. The path planning technology is used for guiding a self-moving device to select a path to move in a working region or return to a docking station. The working region needs to be covered as fully as possible while repetitive movement is reduced. In a narrow region or a blind spot region or an obstacle region, it is ensured that the self-moving device can successfully leave while a coverage rate is kept, and the self-moving device can accurately return along a boundary of the working region to improve return efficiency and the like.

SUMMARY

In view of this, it is necessary to provide a self-moving device, a method for adjusting a movement trajectory, and a computer readable storage medium for the foregoing problems.

A self-moving device includes: a body; a drive apparatus, driving the self-moving device according to a drive instruction to move in a working plane; and an image acquisition module, connected to the body, and configured to continuously acquire an image of the working plane in a traveling direction of the body when the self-moving device moves; and further includes a control circuit, configured to: recognize a feature in the current image, and generate a boundary mark that maps a boundary position in the working plane and/or an obstacle mark of an obstacle position in a picture; provide a reference line correlated with the traveling direction of the body to the picture; and send the drive instruction according to a relative position relationship between the boundary mark and/or the obstacle mark and the reference line, to control a movement trajectory of the self-moving device.

In one of the embodiments, the reference line correlated with the traveling direction of the body includes: at least one of a central axis reference line that maps a projection of a central axis of the body onto the working plane, an edge line reference line that maps a projection of a width edge line of the body parallel to the central axis onto the working plane, a reference line that maps a parallel line that is located between the central axis and the edge line and is parallel to the central axis or a parallel line that is located between the central axis and an outer edge line and is parallel to the outer edge line, and a transverse reference line that maps a projection of a perpendicular of the central axis onto the working plane.

In one of the embodiments, the control circuit is configured to recognize the relative position relationship according to an angle between the central axis reference line and the boundary mark.

In one of the embodiments, a steering angle of the body is greater than $\alpha$ and is less than or equal to $\alpha+90°$, and $\alpha$ is an acute angle or a right angle formed between the central axis reference line and the boundary mark.

In one of the embodiments, the control circuit is configured to recognize the relative position relationship according to a side that is of the central axis reference line and on which the lowest point of the boundary mark is located.

In one of the embodiments, the sending the drive instruction according to a relative position relationship between the boundary mark and/or the obstacle mark and the reference line includes: when the lowest point of the boundary mark is located on a left side of the central axis reference line, sending a drive instruction for controlling the body to rotate clockwise; and the control circuit is configured to: when the lowest point of the boundary mark is located on a right side of the central axis reference line, send a control instruction for controlling the body to rotate counterclockwise.

In one of the embodiments, the sending the drive instruction according to a relative position relationship between the boundary mark and/or the obstacle mark and the reference line includes: when the reference line includes the transverse reference line and the central axis reference line and a reference point on the transverse reference line or the transverse reference line and the boundary mark meet a preset distance relationship, sending a drive instruction to control the body to steer, so that an acute angle or a right angle is formed between the central axis reference line and a first boundary portion when the steering starts, and an acute angle or a right angle is formed between the central axis reference line and a second boundary portion when the steering is completed, where an intersection of the central axis reference line and the boundary mark divides the boundary mark into the first boundary portion and the second boundary portion.

In one of the embodiments, the controlling a movement trajectory of the self-moving device includes: controlling the reference line to maintain a preset position relationship with the boundary mark during movement, to enable a movement trajectory of the body to have a consistent shape with a boundary.

In one of the embodiments, when the boundary mark is a straight line, the controlling the reference line to maintain a preset position relationship with the boundary mark during movement includes: controlling the reference line and the boundary mark to be parallel or coincident, and keeping a preset distance.

In one of the embodiments, when the boundary mark is a curve, the controlling the reference line to maintain a preset position relationship with the boundary mark during movement includes: controlling the reference line or a parallel line of the reference line to be tangential to the boundary mark, and keeping a preset distance.

In one of the embodiments, when the boundary mark is a corner facing outward in the traveling direction, the controlling the reference line to maintain a preset position relationship with the boundary mark during movement includes: controlling movement along a first edge of the corner and keeping the reference line and the first edge coincident, or parallel at a preset distance; monitoring a distance between the self-moving device and a second edge, and when the distance reaches a preset value, controlling the self-moving device to steer, until the reference line and the second edge are coincident, or are parallel at the preset distance; and controlling movement along the second edge of the corner and keeping the reference line and the second edge coincident, or parallel at the preset distance.

In one of the embodiments, when the boundary mark is a corner facing inward relative to the traveling direction, the controlling the reference line to maintain a preset position relationship with the boundary mark during movement includes: controlling movement along a first edge of the corner and keeping the reference line and the first edge coincident, or parallel at a preset distance; when the first edge is invisible in the picture, making the body continue to move until the body has moved the preset distance in the original traveling direction; controlling the self-moving device to steer, until the reference line and a second edge are coincident, or are parallel at the preset distance; and controlling movement along the second edge of the corner and keeping the reference line and the second edge coincident, or parallel at the preset distance.

In one of the embodiments, the reference line is an edge line reference line close to a side of the boundary mark.

In one of the embodiments, the reference line includes a central axis reference line, a left side edge line reference line, and a right side edge line reference line, and the control circuit is configured to: when the obstacle mark is located on a left side of the central axis reference line and is at least partially located between the central axis reference line and the left side edge line reference line, control the self-moving device to steer to the right; and when the obstacle mark is located on a right side of the central axis reference line and is at least partially located between the central axis reference line and the right side edge line reference line, control the self-moving device to steer to the left.

In one of the embodiments, the control circuit is configured to: when the obstacle mark is located on the central axis reference line, control the self-moving device to steer randomly.

In one of the embodiments, the self-moving device is a lawn-mower, and the "recognize a feature in the image, and generate a boundary mark that maps a boundary position in the working plane in a picture" includes: recognizing a grass region and a non-grass region in the image, and fitting a boundary portion between the grass region and the non-grass region into the boundary mark in the picture.

This application further provides a method for adjusting a movement trajectory of a self-moving device, including: acquiring a continuous image of a working plane in a traveling direction of a body of a self-moving device by using an image acquisition module when the self-moving device moves; recognizing a feature in the current image, and generating a boundary mark that maps a boundary position in the working plane and/or an obstacle mark of an obstacle position in a picture; providing a reference line correlated with the traveling direction of the body to the picture; and sending a drive instruction to a drive apparatus of the self-moving device according to a relative position relationship between the boundary mark and/or the obstacle mark and the reference line, to control a movement trajectory of the self-moving device.

In one of the embodiments, the reference line correlated with the traveling direction of the body includes: at least one of a central axis reference line that maps a projection of a central axis of the body onto the working plane, an edge line reference line that maps a projection of a width edge line of the body parallel to the central axis onto the working plane, and a reference line that maps a parallel line that is located between the central axis and the edge line and is parallel to the central axis or a parallel line that is located between the central axis and an outer edge line and is parallel to the outer edge line.

In one of the embodiments, the relative position relationship is recognized according to an angle between the central axis reference line and the boundary mark.

In one of the embodiments, a steering angle of the body is greater than $\alpha$ and is less than or equal to $\alpha+90°$, and $\alpha$ is an acute angle or a right angle formed between the central axis reference line and the boundary mark.

In one of the embodiments, the method further includes: recognizing the relative position relationship according to a side that is of the central axis reference line and on which the lowest point of the boundary mark is located.

In one of the embodiments, the sending the drive instruction according to a relative position relationship between the boundary mark and/or the obstacle mark and the reference line includes: when the lowest point of the boundary mark is located on a left side of the central axis reference line, sending a drive instruction for controlling the body to rotate clockwise; and the control circuit is configured to: when the lowest point of the boundary mark is located on a right side of the central axis reference line, send a control instruction for controlling the body to rotate counterclockwise.

In one of the embodiments, the sending the drive instruction according to a relative position relationship between the boundary mark and/or the obstacle mark and the reference line includes: when the reference line includes the transverse reference line and the central axis reference line and a reference point on the transverse reference line or the transverse reference line and the boundary mark meet a preset distance relationship, sending a drive instruction to control the body to steer, so that an acute angle or a right angle is formed between the central axis reference line and a first boundary portion when the steering starts, and an acute angle or a right angle is formed between the central axis reference line and a second boundary portion when the steering is completed, where an intersection of the central axis reference line and the boundary mark divides the boundary mark into the first boundary portion and the second boundary portion.

In one of the embodiments, the controlling a movement trajectory of the self-moving device includes: controlling the reference line to maintain a preset position relationship with the boundary mark during movement, to enable a movement trajectory of the body to have a consistent shape with a boundary.

In one of the embodiments, when the boundary mark is a straight line, the controlling the reference line to maintain a preset position relationship with the boundary mark during movement includes: controlling the reference line and the boundary mark to be parallel or coincident, and keeping a preset distance.

In one of the embodiments, when the boundary mark is a curve, the controlling the reference line to maintain a preset position relationship with the boundary mark during movement includes: controlling the reference line or a parallel line of the reference line to be tangential to the boundary mark, and keeping a preset distance.

In one of the embodiments, when the boundary mark is a corner facing outward in the traveling direction, the controlling the reference line to maintain a preset position relationship with the boundary mark during movement includes: controlling movement along a first edge of the corner and keeping the reference line and the first edge coincident, or parallel at a preset distance; monitoring a distance between the self-moving device and a second edge, and when the distance reaches a preset value, controlling the self-moving device to steer, until the reference line and the second edge are coincident, or are parallel at the preset distance; and controlling movement along the second edge of the corner and keeping the reference line and the second edge coincident, or parallel at the preset distance.

In one of the embodiments, when the boundary mark is a corner facing inward relative to the traveling direction, the controlling the reference line to maintain a preset position relationship with the boundary mark during movement includes: controlling movement along a first edge of the corner and keeping the reference line and the first edge coincident, or parallel at a preset distance; when the first edge is invisible in the picture, making the body continue to move until the body has moved the preset distance in the original traveling direction; controlling the self-moving device to steer, until the reference line and a second edge are coincident, or are parallel at the preset distance; and controlling movement along the second edge of the corner and keeping the reference line and the second edge coincident, or parallel at the preset distance.

In one of the embodiments, the reference line is an edge line reference line close to a side of the boundary mark.

In one of the embodiments, the reference line includes a central axis reference line, a left side edge line reference line, and a right side edge line reference line, and the sending the drive instruction according to a relative position relationship between the boundary mark and/or the obstacle mark and the reference line includes: when the obstacle mark is located on a left side of the central axis reference line and is at least partially located between the central axis reference line and the left side edge line reference line, sending a control instruction for controlling the self-moving device to steer to the right; and when the obstacle mark is located on a right side of the central axis reference line and is at least partially located between the central axis reference line and the right side edge line reference line, sending a control instruction for controlling the self-moving device to steer to the left.

In one of the embodiments, the sending the drive instruction according to a relative position relationship between the boundary mark and/or the obstacle mark and the reference line includes: when the obstacle mark is located on the central axis reference line, sending a control instruction for controlling the self-moving device to steer randomly.

In one of the embodiments, the self-moving device is a lawn-mower, and the "recognize a feature in the image, and generate a boundary mark that maps a boundary position in the working plane in a picture" includes: recognizing a grass region and a non-grass region in the image, and fitting a boundary portion between the grass region and the non-grass region into the boundary mark in the picture.

This application further provides a computer readable storage medium, storing a computer program thereon. The computer program, when being executed by a processor, implements any foregoing method for adjusting a movement trajectory.

Figure 1:
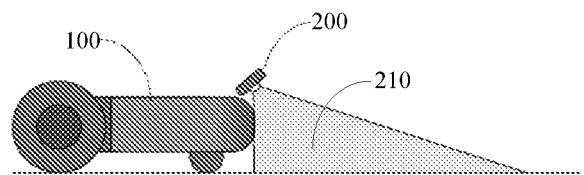
FIG. 1 is a schematic structural diagram of an embodiment of a self-moving device according to this disclosure.

REFERENCE NUMERALS 100. body; 110. central axis; 120. outer contour line; 121. first traveling direction line; 122. second traveling direction line; 200. image acquisition module; 210. field of view range; 300. boundary; 310. first boundary; 320. second boundary; 300'. real boundary; 400. storage medium; 10. working region; 11. non-working region; 500. obstacle; 600. control circuit; and 700. drive apparatus.

DETAILED DESCRIPTION

For ease of understanding the present invention, the present invention is described more comprehensively below with reference to the related accompanying drawings. However, the present invention may be implemented in various different forms, but is not limited to the embodiments described herein. Instead, the embodiments are provided to make the disclosure of the present invention more thorough and complete.

In the present invention, unless otherwise explicitly specified or defined, the terms such as "mount", "install", "connect", "connection", and "fixed" should be understood in a broad sense. For example, the connection may be a fixed connection, a detachable connection, or an integral connection; or the connection may be a mechanical connection or an electrical connection; or the connection may be a direct connection, an indirect connection through an intermediary, or internal communication between two components or mutual interaction relationship between two components unless otherwise explicitly defined. Persons of ordinary skill in the art may understand the specific meanings of the foregoing terms in the present invention according to specific situations.

Terms "first" and "second" are used merely for the purpose of description, and shall not be construed as indicating or implying relative importance or implying a quantity of indicated technical features. Therefore, a feature restricted by "first" or "second" may explicitly indicate or implicitly include at least one of such features. In the descriptions of the present invention, unless explicitly specified, "multiple" means at least two, for example, two or three.

Unless otherwise defined, meanings of all technical and scientific terms used herein are the same as that usually understood by a person skilled in the technical field to which the present invention belongs. Terms used in the specification of the present invention are merely intended to describe objectives of the specific embodiment, and are not intended to limit the present invention. A term "and/or" used herein includes any or all combinations of one or more related listed items.

This embodiment provides a self-moving device, a method for adjusting a movement trajectory, and a computer readable storage medium. The self-moving device may be an autonomous lawn-mower, an autonomous vacuum cleaner, an autonomous mopping device, an autonomous snowplow, or another robotic device that can move autonomously. The self-moving device may autonomously move and perform corresponding work within a specified working region 10, and may also return to a docking station along a boundary corresponding to the working region 10 for parking or charging.

Figure 18:
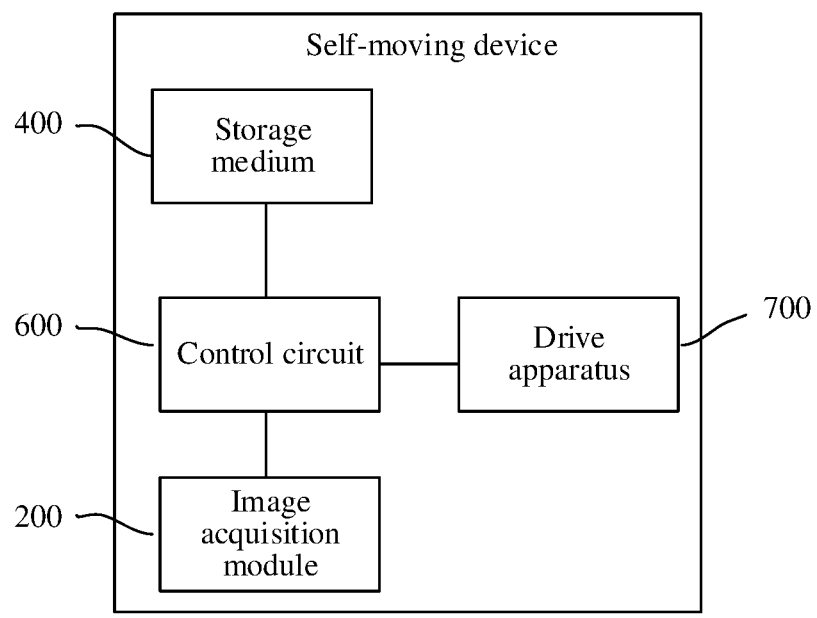
FIG. 18 is a module diagram according to an embodiment of this disclosure.

In one of embodiments a self-moving device is provided. Referring to FIG. 1 and FIG. 18, the self-moving device includes a body 100, an image acquisition module 200, and a control circuit 600.

Specifically, the body 100 includes a drive apparatus 700. The drive apparatus 700 is configured to drive the body 100 according to a received drive instruction to move in a working plane. The body usually includes wheels and a motor driving the wheels to rotate. The wheels may include a driving wheel and a driven wheel. The wheels may be distributed on two sides of the body 100. One, two, or more wheels may be provided on each side.

The body 100 further includes a working module. The working module is configured to perform a specific working task. For example, the self-moving device is an autonomous lawn-mower. The working module includes a grass cutting blade, a cutting motor, and the like, and may further include an auxiliary member such as a grass cutting height adjustment mechanism that optimizes or adjusts grass cutting effect. For example, the self-moving device is an autonomous vacuum cleaner. The working module includes working members such as a dust suction motor, a dust suction port, a dust suction tube, a vacuum chamber, and a dust collection apparatus that perform a dust suction task.

The body 100 may further include an energy module. The energy module is configured to provide energy for various work of the self-moving device. The energy module may include a rechargeable battery and a charging connection structure. The charging connection structure is usually a charging electrical plate. The charging electrical plate may be used in combination with a charging electrical plate disposed at a docking station to charge the self-moving device.

In addition to the foregoing modules, the body 100 may further include a housing for accommodating and mounting the modules, a control panel for operation by a user, and the like, and may further include various environmental sensors such as a humidity sensor, a temperature sensor, an acceleration sensor, and a light sensor. The foregoing sensors may assist the self-moving device in determining a working environment, to perform a corresponding procedure.

The control circuit 600 is a core member of the self-moving device, and is configured to control autonomous movement and working of the self-moving device. Functions performed by the control circuit include: controlling the working module to start working or stop, generating a movement path and controlling the drive apparatus 700 to move along the path, determining an energy level of the energy module and controlling the self-moving device to return to the docking station in time for autonomous docking and charging, performing a corresponding procedure in combination with data of the environmental sensors, and the like.

When the self-moving device cruises and performs tasks in a working region 10, generally, the self-moving device moves along a straight line, and when hitting a boundary 300, the self-moving device steers and return to the working region 10 to continue to move along a straight line, until meeting the boundary 300 again. In the foregoing manner of repeatedly turning back in the working region 10, the self-moving device covers the entire working region 10. Meeting the boundary 300 and steering to turn back are the most frequent case of normal working being interrupted. Therefore, the working efficiency of the self-moving device can be effectively improved by improving the efficiency of steering and turning back and appropriately planning paths after steering.

Figure 2:
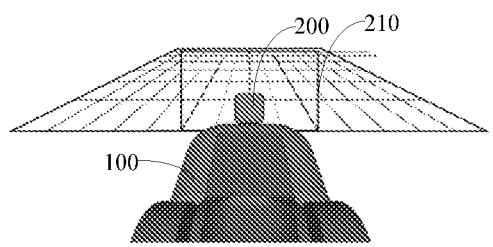
FIG. 2 is a diagram of an embodiment of an application scenario of a movement process of the self-moving device according to this disclosure.

Referring to FIGS. 1 and 2, the self-moving device includes the image acquisition module 200. The image acquisition module 200 is connected to the body 100, and is configured to acquire an image in a traveling direction of the body 100. The image is at least partially an image of a working plane in the traveling direction. The acquired image is located in a field of view range 210 of the image acquisition module 200. The image acquisition module 200 may be various cameras commonly used in the industry.

Generally, the image acquisition module 200 is mounted at a position near the top in the front of the body 100, and may be disposed in the middle. A viewing angle faces the lower front to acquire the image of the working plane. A size of the field of view range 210 may be adjusted according to an actual requirement. When the field of view range 210 is larger, more images in the traveling direction of the body 100 are acquired, and fewer images are acquired when the field of view range is smaller. The body 100 may have a variety of traveling directions, for example, directions of normally moving forward, moving backward, and steering. The traveling direction of the body in this embodiment is the direction of normally moving forward, that is, a direction of a central axis 110 of the body.

For example, referring to FIG. 1, an orthogonal projection of an end portion of the body 100 closest to the traveling direction onto the ground falls within the field of view range 210 of the image acquisition module 200. That is, there is no interval between a region in which the field of view range 210 is located and the body 100, and there is no blind spot region. This can be implemented by adjusting the position and mounting angle of the image acquisition module 200. In this way, a miss in acquisition of an image at a position close to the body 100 in a region in front is avoided.

The control circuit 600 is connected to the image acquisition module 200, and is configured to fit, according to the acquired image, the boundary 300 and/or an obstacle corresponding to the working region 10 in which the self-moving device is located. Specifically, the control circuit 600 recognizes a feature in the current image, and generate a boundary mark that maps a boundary position in the working plane and/or an obstacle mark of an obstacle position in a picture. In either case, a position of the boundary mark/obstacle mark in the picture maps a position of the boundary/obstacle in the working plane in the real world. It needs to be pointed out that the picture may be formed by processing an original image, or is newly generated based on a feature of the original image. Subsequently, processing of superimposing a boundary mark, an obstacle mark, a reference line, and the like on the original image in the picture is used as an example for description. For ease of description, an image is directly described, and it is no longer described one by one that an image is a processed image.

The control circuit 600 further provides the picture with a reference line correlated with the traveling direction of the body 100, and sends the drive instruction according to a relative position relationship between the boundary mark and/or the obstacle mark and the reference line, to control a movement trajectory of the self-moving device. A virtual reference line, a virtual boundary mark, a virtual obstacle mark, and the like based on which the control circuit performs determining and sends an instruction are reference lines such as mappings of the central axis of the body, the boundary, the obstacle, and the like in the real world in a picture. However, for brevity, subsequently, the two are not strictly distinguished. A person skilled in the art can understand, according to scenarios, whether reference lines or the like in corresponding descriptions refer to virtual objects or the real world.

After the image acquisition module 200 acquires an image in the traveling direction of the body 100, the control circuit 600 receives the image, and recognizes the image by using an image recognition technology. If the boundary 300/obstacle exists in the image, the boundary 300/obstacle corresponding to the working region 10 in which the self-moving device is located may be fit according to the image. Certainly, if the boundary 300/obstacle does not exist in the image, it indicates that the self-moving device is still at a specific distance from the boundary 300/obstacle, and the control circuit 600 does not need to interfere with a current traveling direction of the body 100.

For a fitting manner of the boundary 300 by the control circuit 600, the distribution of the working region 10 and a non-working region 11 may be determined by recognizing color information and texture information of the image, to further determine the boundary 300 between the working region 10 and the non-working region 11, that is, recognize a grass region and a non-grass region in the image, and fit a boundary portion between the grass region and the non-grass region into the boundary mark in the picture. An autonomous lawn-mower is used as an example. In the working region 10, the color of grass is green, and the texture is a natural irregular pattern. In the non-working region 11, the ground is soil ground, cement ground, or the like. The color of the ground is usually not green. Even if the color is green, the ground is usually an artificial object and has regular texture. Based on this, when recognizing that the color of a portion is green and the texture is irregular, the control circuit 600 may determine that the portion is categorized into grass, that is, the working region 10. When recognizing that the color of a portion is not green or the texture is regular, the control circuit determines that the portion is categorized into non-grass, that is, the non-working region 11. Alternatively, a deep learning-based visual recognition technology may be used. For example, several training samples are obtained in advance, to form a training sample set. A boundary recognition model is trained based on the training sample set, and the boundary recognition model is gradually optimized. After a fixed boundary recognition model is obtained, an image acquired by the image acquisition module is inputted into the boundary recognition model, to further output a fitting result of a boundary in the image. The image recognition methods listed above can all implement recognition of a boundary. Other similar image recognition methods may be used during actual application, and are not listed one by one herein. In this way, when the boundary 300 exists in an image, the boundary 300 in the image may be accurately recognized by using an image recognition technology and fitted.

The boundary may be alternatively set on the ground in advance, for example, a physical boundary such as a fence or a cable. The physical boundary generally has fixed texture and color. Therefore, the control circuit 600 may recognize corresponding texture and color by using an image recognition technology, that is, may determine a position of the boundary in the image.

After the control circuit 600 fits the boundary 300, when the body 100 moves toward the boundary 300 and the body 100 and the boundary 300 meet a preset distance relationship, an angle relationship between the traveling direction of the body 100 and the boundary 300 is recognized according to the image, and the body 100 is controlled to steer. When the steering starts, an acute angle or a right angle is formed between a reference line of the traveling direction of the body 100 and a first boundary portion 310. When the steering is completed, an acute angle or a right angle is formed between the reference line of the traveling direction of the body 100 and a second boundary portion 312. An intersection of the reference line of the traveling direction of the body 100 and the boundary 300 divides the boundary 300 into the first boundary portion 310 and the second boundary portion 312.

It needs to be noted that "the body 100 moves toward the boundary 300" is a process in which the self-moving device moves to the boundary 300 along a straight line when the self-moving device is in a working mode, that is, the self-moving device performs a task in the working region 10, and is not a process in which the self-moving device searches for the boundary 300 when the self-moving device in an along-edge return mode.

Specifically, the control circuit 600 may determine a distance relationship between the body 100 and the boundary 300 by using image recognition and processing technologies. For example, an image coordinate system may be established in the picture, and a distance between a point on the body 100 and a point on the boundary 300 is further determined based on the coordinate system. In another example, when it is recognized that the lowest point of the boundary 300 in the picture is greater than or equal to one third of the boundary 300 in the picture in which the lowest point is located, it may be determined that the body 100 and the boundary 300 meet the preset distance relationship. That is, only an approximate position relationship is determined. Certainly, during actual application, the distance relationship between the body 100 and the boundary 300 may be determined from another angle by using an image recognition technology, provided that the distance relationship between the body 100 and the boundary 300 can be represented.

When the body 100 moves toward the boundary 300 and the body 100 and the boundary 300 meet the preset distance relationship, that is, the body 100 and the boundary 300 are close, the body 100 is controlled to steer according to the angle relationship between the traveling direction of the body 100 and the boundary 300 recognized from the image. An execution order of the step of determining the distance relationship between the body 100 and the boundary 300 and the step of recognizing the angle relationship between the traveling direction of the body 100 and the boundary 300 according to the image is not unique. It may be first determined that the body 100 and the boundary 300 meet the preset distance relationship, and then the angle relationship between the traveling direction of the body 100 and the boundary 300 is recognized according to the image. Alternatively, the angle relationship between the traveling direction of the body 100 and the boundary 300 may be first recognized according to the image, and then the distance relationship between the body 100 and the boundary 300 is determined. During actual application, the order may be determined according to an actual requirement. This is not limited herein.

When the body 100 approaches the boundary 300, that is, the body 100 and the boundary 300 meet the preset distance relationship, and it is recognized that the angle relationship between the traveling direction of the body 100 and the boundary 300, a rotation direction, a steering angle, and the like of the body 100 may be determined according to an angle relationship, and the body 100 is controlled accordingly to steer.

Figure 3:
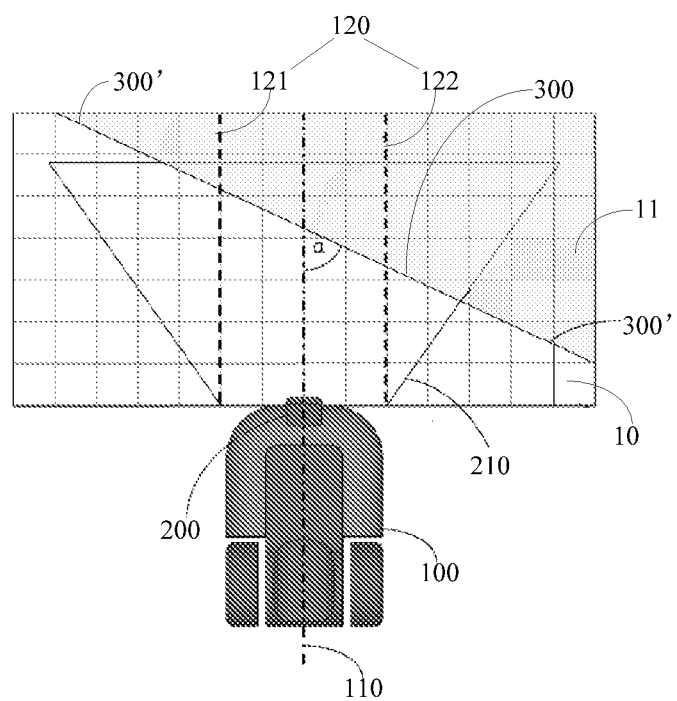
FIG. 3 is a schematic structural diagram of an embodiment when a self-moving device moves toward a boundary according to this disclosure.
Figure 4:
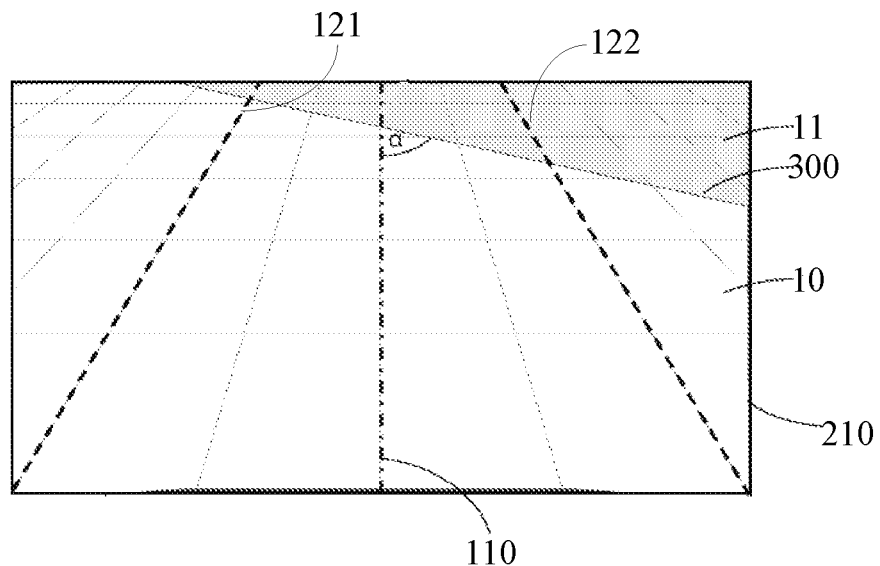
FIG. 4 is a schematic diagram of an embodiment of a field of view range corresponding to FIG. 3.

Referring to FIGS. 3 and 4, the boundary 300 in FIG. 3 is a boundary that is fitted in the image and is in the field of view range 210. A real boundary 300' is located outside the field of view range 210, and is an actual boundary in the real world. Before steering, that is, in a movement process of the body 100 toward the boundary 300, the traveling direction of the body 100 points to the boundary 300. A reference line used for representing the traveling direction of the body 100 is assumed. The reference line and the boundary 300 definitely form an intersection. The intersection divides the boundary 300 into two portions. The two portions are assumed as the first boundary portion 310 and the second boundary portion 312. When the body 100 approaches the boundary 300 in a nonperpendicular manner, one of the first boundary portion 310 and the second boundary portion 312 definitely forms an acute angle with the reference line. When the body 100 approaches the boundary 300 in a perpendicular manner, the first boundary portion 310 and the second boundary portion 312 both form right angles with a reference line. In this embodiment, it is assumed that the first boundary portion 310 forms an acute angle with the reference line. That is, before steering starts, an acute angle or a right angle is formed between the reference line and the first boundary portion 310. In this case, in a process of controlling the body 100 to steer, steering is performed at a small angle, so that when the steering is completed, an acute angle or a right angle is formed between the reference line and the second boundary portion 312.

It needs to be noted that, an intersection between the reference line and the boundary 300 when the steering starts may be not the same as that when the steering is completed. That is, the first boundary portion 310 and the second boundary portion 312 may change at two moments. However, this does not affect the embodiment of the foregoing solution in this application. For example, when the steering starts, the intersection is a point A. The point A divides the boundary 300 into the upper left first boundary portion and the lower right second boundary portion 312. An acute angle is formed between the first boundary portion 310 and the reference line. When the steering is completed, the intersection is a point B. The point B deviates to the upper left relative to the point A. The point B also divides the boundary 300 into the upper left first boundary portion 310 and the lower right second boundary portion 312. An acute angle is formed between the second boundary portion 312 and the reference line.

In this embodiment, the angle relationship between the traveling direction of the body 100 and the boundary 300 is recognized by using an image recognition technology. Steering of the body 100 may be initially determined according to the angle relationship. If an acute angle or a right angle is formed between the reference line of the traveling direction of the body 100 and the first boundary portion 310 when the steering starts, the body 100 is controlled to steer to form an acute angle or a right angle between the reference line of the traveling direction of the body 100 and the second boundary portion 312. That is, the body 100 steers back to the working region 10 at a small angle based on the original path to continue to work. The body 100 is kept from steering at a large angle to reach a region away from the original path, to effectively improve steering efficiency and the appropriateness of path planning, thereby further improving the movement and working efficiency of the self-moving device.

In one of the embodiments, referring to FIG. 3 and FIG. 4, the reference line correlated with the traveling direction of the body 100 includes: at least one of a central axis reference line that maps a projection of a central axis 110 of the body 100 onto the working plane, an edge line reference line that maps a projection of a width edge line of the body 100 parallel to the central axis 110 onto the working plane, a reference line that maps a parallel line that is located between the central axis 110 and the edge line and is parallel to the central axis 110 or a parallel line that is located between the central axis 110 and an outer edge line and is parallel to the outer edge line, and a transverse reference line that maps a projection of a perpendicular of the central axis 110 onto the working plane. That is, the reference line used for representing the traveling direction of the body 100 is not unique, and may be the central axis 110 of the body 100, or may be outer contour lines 120 that set the two sides of the body 100 in the image, that is, the width edge line of the body parallel to the central axis 110. An extension direction of the outer contour lines 120 is the traveling direction of the body 100. The outer contour lines 120 are parallel and define a width equal to a width of the body 100. Alternatively, another parallel line that is parallel to the central axis 110 or the outer contour line 120 and is between the central axis 110 and the outer contour line 120 may be used. For example, a member on the body 100 is used as a starting point to draw a parallel line parallel to the traveling direction of the body 100. The reference line further includes a line that is not parallel to the central axis 110 but is correlated with the central axis 110 in a direction and a position, for example, a transverse reference line that maps a projection of a perpendicular of the central axis 110 onto the working plane.

During actual application, any one of the foregoing or a combination thereof may be selected as the reference line. For example, the central axis 110 of the body 100 is used as the reference line.

In this embodiment, a manner of determining the angle relationship between the traveling direction of the body 100 and the boundary 300 is not unique. The angle relationship between the traveling direction of the body 100 and the boundary 300 may be recognized in various manners based on the image recognition technology.

In one of the embodiments, the control circuit 600 is configured to recognize the angle relationship between the traveling direction of the body 100 and the boundary 300 according to an angle between the central axis 110 of the body 100 and the boundary 300, that is, recognize the relative position relationship between the two according to an angle between the central axis reference line and the boundary mark in the picture. For example, the acute angle between the central axis 110 of the body 100 and the boundary 300 is located on a right side of the central axis 110. It indicates that a right half portion of the body 100 is closer to the boundary 300. In this case, the body 100 may be controlled to rotate to the left, to control the self-moving device to continue to perform a task in the working region 10 on a left side in the image. In contrast, the acute angle between the central axis 110 of the body 100 and the boundary 300 is located on a left side of the central axis 110. It indicates that a left half portion of the body 100 is closer to the boundary 300. In this case, the body 100 may be controlled to rotate to the right, to control the self-moving device to continue to perform a task in the working region 10 on a right side in the image. Such path planning is more appropriate, making it convenient to fully cover the working region 10. In addition, the foregoing control process is performed based on an image recognition technology, and the efficiency is higher compared with a conventional detection and sensing technology for a boundary.

As an alternative embodiment, the control circuit 600 may recognize the angle relationship between the traveling direction of the body 100 and the boundary 300 according to the outer contour line 120 of the body 100 or another angle used to represent an extension line of the traveling direction of the body 100 and the boundary 300.

In one of the embodiments, the control circuit 600 is configured to recognize the angle relationship between the traveling direction of the body 100 and the boundary 300 according to that the lowest point of the boundary 300 in the image is located on an edge side of the image, that is, recognize the relative position relationship according to a side that is of the central axis reference line and on which the lowest point of the boundary mark is located. A side of the image on which the lowest point of the boundary 300 is located indicates a side of the body 100 closer to the boundary 300. For example, the lowest point of the boundary 300 in the image is located on a right side edge of the image, indicating that a right side of the body 100 is closer to the boundary 300. In contrast, the lowest point of the boundary 300 in the image is located on a left side edge of the image, indicating that a left side of the body 100 is closer to the boundary 300.

In one of the embodiments, the control circuit 600 is configured to: when the lowest point of the boundary 300 is located on a left edge side of the image, control the body 100 to rotate clockwise.

In one of the embodiments, the control circuit is configured to: when the lowest point of the boundary 300 is located on a right edge side of the image, control the body 100 to rotate counterclockwise.

That is, when the lowest point of the boundary mark is located on a left side of the central axis reference line, a drive instruction for controlling the body 100 to rotate clockwise is sent. When the lowest point of the boundary mark is located on the left side of the central axis reference line, a control instruction for controlling the body 100 to rotate counterclockwise is sent.

When the control circuit 600 determines that the lowest point of the boundary 300 is located on the left edge side of the image, it indicates that the left side of the body 100 is closer to the boundary 300, and the body 100 is controlled to rotate clockwise, to continue to perform a working task in the working region 10 on the right side in the image. When the control circuit 600 determines that the lowest point of the boundary 300 is located the right edge side of the image, it indicates that the right side of the body 100 is closer to the boundary 300, and the body 100 is controlled to rotate counterclockwise, to continue to perform a working task in the working region 10 on the left side in the image. Such path planning is more appropriate, making it convenient to fully cover the working region 10. In addition, the foregoing control process is performed based on an image recognition technology, and the efficiency is higher compared with a conventional detection and sensing technology for the boundary 300.

In one of the embodiments, a steering angle of the body 100 is greater than $\alpha$ and is less than or equal to $\alpha+90°$, and referring to FIG. 4, $\alpha$ is an acute angle or a right angle formed between the reference line of the traveling direction of the body 100 and the first boundary portion 310, that is, an acute angle or a right angle formed between the central axis reference line and the boundary mark. The steering angle of the body 100 should be neither excessively large nor excessively small. If the steering angle is excessively large, the body tends to return to the working region 10 in which a task has been performed, which is not conducive to fully covering the working region 10. If the steering angle is excessively small, it is not easy for the body to leave the boundary 300, and the body keeps performing a steering operation, leading to low efficiency. Based on this, it is set in this embodiment that the steering angle of the body 100 is greater than $\alpha$ and less than or equal to $\alpha+90°$. It is assumed that, the angle relationship between the traveling direction of the body 100 and the boundary 300 is that the acute angle α between the central axis 110 of the body 100 and the boundary 300 is located on the right side of the central axis 110, that is, the right side of the body 100 is closer to the boundary 300. In this case, the body 100 is controlled to rotate to the left, and the steering angle is greater than α. That is, the body 100 may rotate to a position with the traveling direction pointing to the inside of the boundary, and is not parallel to the boundary 300, which is conducive to leaving the boundary 300, and the body turns back into the boundary to perform a task. In addition, the steering angle is less than or equal to α+90°, that is, ensures that the body 100 does not return to the working region 10 in which a working task has been performed. It is avoided that the body repeatedly performs a task at an original position and does not continue to move forward to a working region 10 in which a task has not been performed to perform a task, which helps to ensure full coverage of the working region 10.

During recognition of the angle relationship between the traveling direction of the body 100 and the boundary 300, an actual shape of the boundary 300 needs to be considered. For boundaries 300 of different shapes, a manner of determining the angle relationship between the boundary 300 and the traveling direction of the body 100 varies.

In one of the embodiments, when the boundary 300 is a straight line, the angle relationship is an angle between the boundary 300 and the reference line of the traveling direction of the body 100. If the boundary 300 is a straight line, an angle between the boundary 300 and the reference line is directly recognized, and the angle is used as an angle relationship between the reference line and the boundary 300.

In one of the embodiments, when the boundary 300 is a non-straight line, at least one preset point is selected from the boundary 300, and the intersection between the reference line of the traveling direction of the body 100 and the boundary 300 and the preset point are connected to form a straight line. The angle relationship is an angle between the straight line and the reference line of the traveling direction of the body 100. For example, the fit boundary 300 may have a wave shape, an arc shape, or another non-straight line shape. For this type of boundary 300, several preset points may be selected from the boundary 300, and the intersection between the reference line and the boundary 300 and the several preset points are connected into a straight line. The straight line is used as a reference straight line. An angle between the straight line and reference line is used as the angle relationship between the reference line and the boundary 300.

Figure 19:
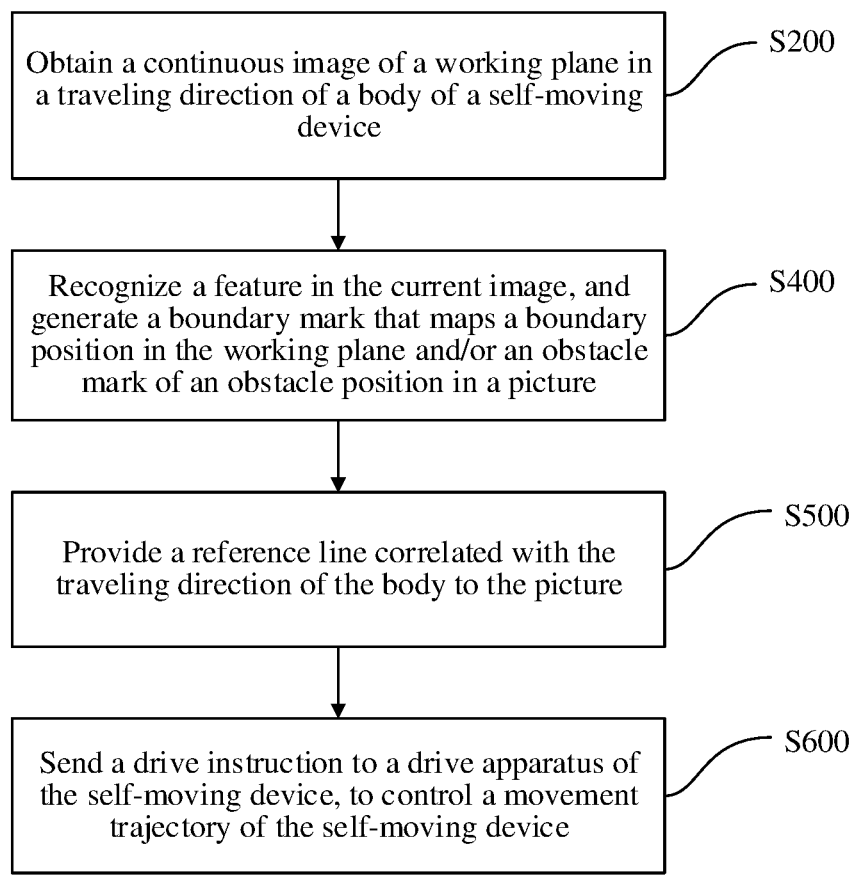
FIG. 19 is a flowchart according to an embodiment of this disclosure.

Reference FIG. 19, this embodiment further provides a method for adjusting a movement trajectory, used in a self-moving device. The self-moving device includes a body 100 and an image acquisition module 200 connected to the body 100. The image acquisition module 200 is configured to acquire an image in a traveling direction of the body 100. The method for adjusting a movement trajectory includes the following steps.

Step S200: When the self-moving device moves, obtain a continuous image of a working plane in the traveling direction of the body 100 of the self-moving device by using the image acquisition module 200.

Step S400: Recognize a feature in the current image, and generate a boundary mark that maps a boundary position in the working plane and/or an obstacle mark of an obstacle position in a picture.

Step S500: Provide a reference line correlated with the traveling direction of the body 100 to the picture.

The reference line correlated with the traveling direction of the body 100 includes: at least one of a central axis reference line that maps a projection of a central axis 110 of the body 100 onto the working plane, an edge line reference line that maps a projection of a width edge line of the body 100 parallel to the central axis 110 onto the working plane, and a reference line that maps a parallel line that is located between the central axis 110 and the edge line and is parallel to the central axis 110 or a parallel line that is located between the central axis 110 and an outer edge line and is parallel to the outer edge line.

Step S600: Send a drive instruction to a drive apparatus 700 of the self-moving device according to a relative position relationship between the boundary mark and/or the obstacle mark and the reference line, to control a movement trajectory of the self-moving device. In an embodiment, the relative position relationship may be recognized according to an angle between the central axis reference line and the boundary mark.

Specifically, in an embodiment, when the body 100 moves toward the boundary 300 and the body 100 and the boundary 300 meet a preset distance relationship, an angle relationship between the traveling direction of the body 100 and the boundary 300 is recognized according to the image, and the body 100 is controlled to steer. When the steering starts, an acute angle or a right angle is formed between a reference line of the traveling direction of the body 100 and a first boundary portion 310. When the steering is completed, an acute angle or a right angle is formed between the reference line of the traveling direction of the body 100 and a second boundary portion 312. An intersection of the reference line of the traveling direction of the body 100 and the boundary 300 divides the boundary 300 into the first boundary portion 310 and the second boundary portion 312.

After receiving the image in the traveling direction of the body 100 acquired by the image acquisition module 200, the image is recognized by using an image recognition technology. If the boundary 300 exists in the image, the boundary 300 corresponding to the working region 10 in which the self-moving device is located may be fit according to the image. Certainly, if the boundary 300 does not exist in the image, it indicates that the self-moving device is still at a specific distance from the boundary 300, and it is not necessary to interfere with a current traveling direction of the body 100.

In step S400, for a fitting manner of the boundary 300, the distribution of the working region 10 and a non-working region 11 may be determined by recognizing color information and texture information of the image, to further determine the boundary 300 between the working region 10 and the non-working region 11. An autonomous lawn-mower is used as an example. In the working region 10, the color of grass is green, and the texture is a natural irregular pattern. In the non-working region 11, the ground is soil ground, cement ground, or the like. The color of the ground is usually not green. Even if the color is green, the ground is usually an artificial object and has regular texture. Based on this, when recognizing that the color of a portion is green and the texture is irregular, the control circuit 600 may determine that the portion is categorized into grass, that is, the working region 10. When recognizing that the color of a portion not is green or the texture is regular, the control circuit determines that the portion is categorized into non-grass, that is, the non-working region 11. In this way, when the boundary 300 exists in an image, the boundary 300 in the image may be accurately recognized by using an image recognition technology and fitted.

The boundary 300 may be alternatively set on the ground in advance, for example, a physical boundary 300 such as a fence or a cable. The physical boundary 300 generally has fixed texture and color. Therefore, corresponding texture and color may be recognized by using an image recognition technology, that is, a position of the boundary 300 in the image may be determined.

Figure 11:
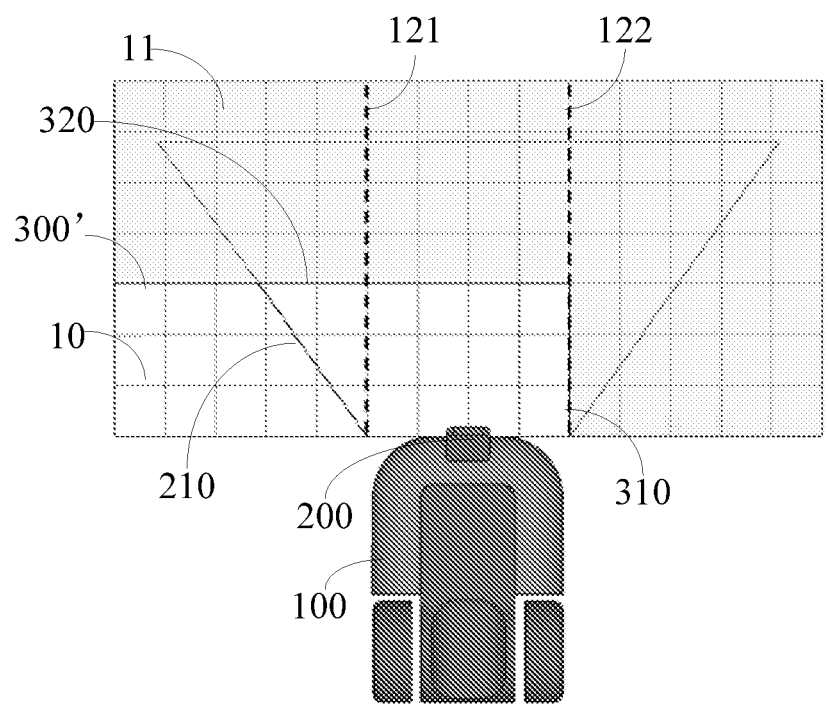
FIG. 11 is a schematic structural diagram of an embodiment when the self-moving device moves along an edge and the boundary is a corner region of a structure according to this disclosure.

In step S600, "the body 100 moves toward the boundary 300" is a process in which the self-moving device moves to the boundary 300 along a straight line when the self-moving device is in a working mode, that is, the self-moving device performs a task in the working region 10, and is not a process in which the self-moving device searches for the boundary 300 when the self-moving device in an along-edge mode (as shown in FIG. 11). The along-edge mode includes modes such as along-edge return, performing a task along an edge of the working region 10, and entering a second region from a first region. That is, it may be understood that, the method for adjusting a movement trajectory provided in this embodiment is performed based on a working mode in which the self-moving device performs a task in the working region 10.

When the boundary 300 is fit in the image, a distance relationship between the body 100 and the boundary 300 may be determined by using image recognition and processing technologies. For example, an image coordinate system may be established in the image, and a distance between a point on the body 100 and a point on the boundary 300 is further determined based on the coordinate system. In another example, when it is recognized that the lowest point of the boundary 300 in the image is greater than or equal to one third of the boundary 300 in the image in which the lowest point is located, it may be determined that the body 100 and the boundary 300 meet the preset distance relationship. That is, only an approximate position relationship is determined. Certainly, during actual application, the distance relationship between the body 100 and the boundary 300 may be determined from another angle by using an image recognition technology, provided that the distance relationship between the body 100 and the boundary 300 can be represented, to ensure that steering is implemented in time at an appropriate position as the body 100 approaches the boundary 300.

When the body 100 moves toward the boundary 300 and the body 100 and the boundary 300 meet the preset distance relationship, that is, the body 100 and the boundary 300 are close, the body 100 is controlled to steer according to the angle relationship between the traveling direction of the body 100 and the boundary 300 recognized from the image. An execution order of the step of determining the distance relationship between the body 100 and the boundary 300 and the step of recognizing the angle relationship between the traveling direction of the body 100 and the boundary 300 according to the image is not unique. It may be first determined that the body 100 and the boundary 300 meet the preset distance relationship, and then the angle relationship between the traveling direction of the body 100 and the boundary 300 is recognized according to the image. Alternatively, the angle relationship between the traveling direction of the body 100 and the boundary 300 may be first recognized according to the image, and then the distance relationship between the body 100 and the boundary 300 is determined. During actual application, the order may be determined according to an actual requirement. This is not limited herein.

When the body 100 approaches the boundary 300, that is, the body 100 and the boundary 300 meet the preset distance relationship, and it is recognized that the angle relationship between the traveling direction of the body 100 and the boundary 300, a rotation direction, a steering angle, and the like of the body 100 may be determined according to an angle relationship, and the body 100 is controlled accordingly to steer.

Before steering, that is, in a movement process of the body 100 toward the boundary 300, the traveling direction of the body 100 points to the boundary 300. A reference line used for representing the traveling direction of the body 100 is assumed. The reference line and the boundary 300 definitely form an intersection. The intersection divides the boundary 300 into two portions. The two portions are assumed as the first boundary portion 310 and the second boundary portion 312. When the body 100 approaches the boundary 300 in a nonperpendicular manner, any portion of the first boundary portion 310 and the second boundary portion 312 definitely forms an acute angle with the reference line. When the body 100 approaches the boundary 300 in a perpendicular manner, the first boundary portion 310 and the second boundary portion 312 both form right angles with a reference line. In this embodiment, it is assumed that the first boundary portion 310 forms an acute angle with the reference line. That is, before steering starts, an acute angle or a right angle is formed between the reference line and the first boundary portion 310. In this case, in a process of controlling the body 100 to steer, steering is performed at a small angle, so that when the steering is completed, an acute angle or a right angle is formed between the reference line and the second boundary portion 312.

It needs to be noted that, an intersection between the reference line and the boundary 300 when the steering starts may be not the same as that when the steering is completed. That is, the first boundary portion 310 and the second boundary portion 312 may change at two moments. However, this does not affect the embodiment of the foregoing solution in this application. For example, when the steering starts, the intersection is a point A. The point A divides the boundary 300 into the upper left first boundary portion 310 and the lower right second boundary portion 312. An acute angle is formed between the first boundary portion 310 and the reference line. When the steering is completed, the intersection is a point B. The point B deviates to the upper left relative to the point A. The point B also divides the boundary 300 into the upper left first boundary portion 310 and the lower right second boundary portion 312. An acute angle is formed between the second boundary portion 312 and the reference line.

In this embodiment, the angle relationship between the traveling direction of the body 100 and the boundary 300 is recognized by using an image recognition technology. Steering of the body 100 may be initially determined according to the angle relationship. If an acute angle or a right angle is formed between the reference line of the traveling direction of the body 100 and the first boundary portion 310 when the steering starts, the body 100 is controlled to steer to form an acute angle or a right angle between the reference line of the traveling direction of the body 100 and the second boundary portion 312. That is, the body 100 steers back to the working region 10 at a small angle based on the original path to continue to work. The body 100 is kept from steering at a large angle to reach a region away from the original path, to effectively improve steering efficiency and the appropriateness of path planning, thereby further improving the movement and working efficiency of the self-moving device.

In one of the embodiments, referring to FIG. 3 and FIG. 4, the reference line of the traveling direction of the body 100 includes at least one of the central axis 110 of the body 100, an outer contour line 120 used for indicating a width of the body 100 in the image, a parallel line that is located between the central axis 110 and the outer contour line 120 and is parallel to the central axis 110, or a parallel line that is located between the central axis 110 and the outer contour line 120 and is parallel to the outer contour line 120.

That is, the reference line used for representing the traveling direction of the body 100 is not unique, and may be the central axis 110 of the body 100, or may be outer contour lines 120 that set the two sides of the body 100 in the image. An extension direction of the outer contour lines 120 is the traveling direction of the body 100. The outer contour lines 120 are parallel and define a width equal to a width of the body 100. Alternatively, another parallel line that is parallel to the central axis 110 or the outer contour line 120 and is between the central axis 110 and the outer contour line 120 may be used. For example, a member on the body 100 is used as a starting point to draw a parallel line parallel to the traveling direction of the body 100. The reference line may be generated automatically in the image after the image in the traveling direction of the body 100 is obtained.

In this embodiment, the central axis 110 of the body 100 may be used as the reference line.

In this embodiment, a manner of determining the angle relationship between the traveling direction of the body 100 and the boundary 300 is not unique. The angle relationship between the traveling direction of the body 100 and the boundary 300 may be recognized in various manners based on the image recognition technology.

In one of the embodiments, step S600, that is, the step of recognizing the angle relationship between the traveling direction of the body 100 and the boundary 300 according to the image includes: recognizing the angle relationship between the traveling direction of the body 100 and the boundary 300 according to an angle between the central axis 110 of the body 100 and the boundary 300.

For example, the acute angle between the central axis 110 of the body 100 and the boundary 300 is located on a right side of the central axis 110. It indicates that a right half portion of the body 100 is closer to the boundary 300. In this case, the body 100 may be controlled to rotate to the left, to control the self-moving device to continue to perform a task in the working region 10 on a left side in the image. In contrast, the acute angle between the central axis 110 of the body 100 and the boundary 300 is located on a left side of the central axis 110. It indicates that a left half portion of the body 100 is closer to the boundary 300. In this case, the body 100 may be controlled to rotate to the right, to control the self-moving device to continue to perform a task in the working region 10 on a right side in the image. Such path planning is more appropriate, making it convenient to fully cover the working region 10. In addition, the foregoing control process is performed based on an image recognition technology, and the efficiency is higher compared with a conventional detection and sensing technology for the boundary 300.

As an alternative embodiment, the angle relationship between the traveling direction of the body 100 and the boundary 300 may be recognized according to the outer contour line 120 of the body 100 or another angle used to represent an extension line of the traveling direction of the body 100 and the boundary 300.

In one of the embodiments, step S600, that is, the step of recognizing the angle relationship between the traveling direction of the body 100 and the boundary 300 according to the image includes: recognizing the angle relationship between the traveling direction of the body 100 and the boundary 300 according to that the lowest point of the boundary 300 in the image is located on an edge side of the image. That is, the relative position relationship is recognized according to a side that is of the central axis reference line and on which the lowest point of the boundary mark is located.

A side of the image on which the lowest point of the boundary 300 is located indicates a side of the body 100 closer to the boundary 300. For example, the lowest point of the boundary 300 in the image is located on a right side edge of the image, indicating that a right side of the body 100 is closer to the boundary 300. In contrast, the lowest point of the boundary 300 in the image is located on a left side edge of the image, indicating that a left side of the body 100 is closer to the boundary 300.

In one of the embodiments, the step of controlling the body 100 to steering in step S600 includes:
when the lowest point of the boundary 300 is located on a left edge side of the image, controlling the body 100 to rotate clockwise; and
when the lowest point of the boundary 300 is located on a right edge side of the image, controlling the body 100 to rotate counterclockwise.

That is, when the lowest point of the boundary mark is located on a left side of the central axis reference line, a drive instruction for controlling the body 100 to rotate clockwise is sent. When the lowest point of the boundary mark is located on the left side of the central axis reference line, a control instruction for controlling the body 100 to rotate counterclockwise is sent.

When it is determined that the lowest point of the boundary 300 is located on the left edge side of the image, it indicates that the left side of the body 100 is closer to the boundary 300, and the body 100 is controlled to rotate clockwise, to continue to perform a working task in the working region 10 on the right side in the image. When it is determined that the lowest point of the boundary 300 is located the right edge side of the image, it indicates that the right side of the body 100 is closer to the boundary 300, and the body 100 is controlled to rotate counterclockwise, to continue to perform a working task in the working region 10 on the left side in the image. Such path planning is more appropriate, making it convenient to fully cover the working region 10. In addition, the foregoing control process is performed based on an image recognition technology, and the efficiency is higher compared with a conventional detection and sensing technology for the boundary 300.

In one of the embodiments, in the step of controlling the body 100 to steering in step S600, a steering angle of the body 100 is greater than $\alpha$ and is less than or equal to $\alpha+90°$, and referring to FIG. 3 and FIG. 4, $\alpha$ is an acute angle or a right angle formed between the reference line of the traveling direction of the body 100 and the first boundary portion 310, that is, $\alpha$ is an acute angle or a right angle formed between the central axis reference line and the boundary mark.

The steering angle of the body 100 should be neither excessively large nor excessively small. If the steering angle is excessively large, the body tends to return to the working region 10 in which a task has been performed, which is not conducive to fully covering the working region 10. If the steering angle is excessively small, it is not easy for the body to leave the boundary 300, and the body keeps performing a steering operation, leading to low efficiency. Based on this, it is set in this embodiment that the steering angle of the body 100 is greater than α and less than or equal to α+90°. It is assumed that, the angle relationship between the traveling direction of the body 100 and the boundary 300 is that the acute angle α between the central axis 110 of the body 100 and the boundary 300 is located on the right side of the central axis 110, that is, the right side of the body 100 is closer to the boundary 300. In this case, the body 100 is controlled to rotate to the left, and the steering angle is greater than α. That is, the body 100 may rotate to a position with the traveling direction pointing to the inside of the boundary, and is not parallel to the boundary 300, which is conducive to leaving the boundary 300, and the body turns back into the boundary to perform a task. In addition, the steering angle is less than or equal to α+90°, that is, ensures that the body 100 does not return to the working region 10 in which a working task has been performed. It is avoided that the body repeatedly performs a task at an original position and does not continue to move forward to a working region 10 in which a task has not been performed to perform a task, which helps to ensure full coverage of the working region 10.

During recognition of the angle relationship between the traveling direction of the body 100 and the boundary 300, an actual shape of the boundary 300 needs to be considered. For boundaries 300 of different shapes, a manner of determining the angle relationship between the boundary 300 and the traveling direction of the body 100 varies.

In one of the embodiments, when the boundary 300 is a straight line, the angle relationship is an angle between the boundary 300 and the reference line of the traveling direction of the body 100. If the boundary 300 is a straight line, an angle between the boundary 300 and the reference line is directly recognized, and the angle is used as an angle relationship between the reference line and the boundary 300.

In one of the embodiments, when the boundary 300 is a non-straight line, at least one preset point on the boundary 300 is selected from the boundary 300, and the intersection between the reference line of the traveling direction of the body 100 and the boundary 300 and the preset point on the boundary 300 are connected to form a straight line. The angle relationship is an angle between the straight line and the reference line of the traveling direction of the body 100. For example, the fit boundary 300 may have a wave shape, an arc shape, or another non-straight line shape. For this type of boundary 300, several preset points may be selected from the boundary 300, and the intersection between the reference line and the boundary 300 and the several preset points are connected into a straight line. The straight line is used as a reference straight line. An angle between the straight line and reference line is used as the angle relationship between the reference line and the boundary 300.

In one of the embodiments, after step S400, the method for adjusting a movement trajectory provided in this embodiment further includes:
  obtaining a distance between the body 100 and a preset position point on the boundary 300; and
  when the distance between the body 100 and the preset position point on the boundary 300 reaches a preset value, determining that the body 100 and the boundary 300 meet the preset distance relationship.

That is, a reference position point is preset on the boundary 300. After the boundary 300 is fit in the image, a distance between the body 100 and the position point is obtained in real time. When the distance reaches the preset value, it is determined that the body 100 and the boundary 300 meet the preset distance relationship, that is, a distance between the body 100 and the boundary 300 reaches a minimum limiting value, it is not suitable to continue to approach the boundary 300, and the body 100 should be controlled in time to steer.

The distance between the body 100 and the preset position point is obtained by using an image recognition technology, for example, a manner in which an image coordinate system may be established, and a distance is determined according to coordinates.

In one of the embodiments, the preset position point includes any one of an intersection between the boundary 300 and the reference line of the traveling direction of the body 100, an intersection between the boundary 300 and an outer edge of the image, and a position point on the boundary 300 closest to the body 100. That is, a preset position point may be selected according to an actual requirement, provided that a distance between the preset position point and the body 100 can represent the distance between the body 100 and the boundary 300.

A point may be selected from the body 100, and may be a central position point of a front end of the body 100, or may be another position point, to further determine a distance between the position point on the body 100 and the preset position point on the boundary 300.

In summary, it may be understood that the reference line includes a transverse reference line and a central axis reference line. The transverse reference line is perpendicular to the central axis reference line, and a mapping of the transverse reference line in the real world may be a projection of points on a front end portion of the body 100 onto the working plane. When a reference point on the transverse reference line or the transverse reference line and the boundary mark meet a preset distance relationship, a drive instruction is sent to control the body 100 to steer, so that an acute angle or a right angle is formed between the central axis reference line and a first boundary portion 310 when the steering starts, and an acute angle or a right angle is formed between the central axis reference line and a second boundary portion 312 when the steering is completed, where an intersection of the central axis reference line and the boundary mark divides the boundary mark into the first boundary portion 310 and the second boundary portion 312.

In one of the embodiments, step S600, that is, the step of recognizing the angle relationship between the traveling direction of the body 100 and the boundary 300 according to the image, and controlling the body 100 to steer includes: controlling the body 100 to rotate in a direction of reducing the acute angle or the right angle formed between the reference line and the first boundary portion 310. That is, the body 100 is controlled to rotate in a direction of reducing the acute angle or the right angle formed between the reference line and the first boundary portion 310, and form an acute angle or a right angle between the reference line and the second boundary portion 312 when the steering is completed. The steering control strategy and the foregoing steering control strategy (for example, the acute angle between the central axis 110 of the body 100 and the boundary 300 is located on a right side of the central axis 110, and the body 100 is controlled to rotate counterclockwise) have the same control result, and only objects of determination and recognition are different. In this embodiment, the steering of the body 100 may be controlled according to any one of the foregoing control manners.

In another embodiment, a perpendicular to the boundary 300 may be drawn at the intersection between the boundary 300 and the reference line in the image. When the body 100 is controlled to steer, so that a line segment formed by connecting a preset position point on the reference line and the intersection when the steering starts is located on one side of the perpendicular, and when the steering is completed, the line segment formed by connecting the preset position point on the reference line and the intersection is located on the other side of the perpendicular. It is assumed that, the preset position point on the reference line is a point A that is on the central axis 110 of the body 100 and is located at the front end of the body 100. Before the steering starts, an intersection between the boundary 300 and the central axis 110 is a point B. A perpendicular to the boundary 300 is drawn at the point B. A line segment AB is located on the right side of the perpendicular. The body 100 rotates to the left. The point A displaces accordingly. It is assumed that the point A after the displacement is a point A1, so that when the steering is completed, a line segment formed by connecting the point A1 and the point B is located on the left side of the perpendicular. The steering control strategy provided in this embodiment also is applicable to this application.

In one of the embodiments, a self-moving device is provided. Referring to FIG. 1, the self-moving device includes a body 100, an image acquisition module 200, and a control circuit 600.

The image acquisition module 200 is connected to the body 100, and is configured to acquire an image in a traveling direction of the body 100. The image is located in a field of view range 210 of the image acquisition module 200. The control circuit 600 is connected to the image acquisition module 200, and is configured to fit a boundary 300 corresponding to a working region 10 in which the self-moving device is located and a traveling direction line on a side of the body 100 close to the boundary 300, and adjust a movement trajectory of the body 100 according to a position relationship between the boundary 300 and the traveling direction line on the side of the body 100 close to the boundary 300, to make the movement trajectory of the body 100 consistent with the boundary 300.

For a manner of fitting the boundary 300 by the body 100, the image acquisition module 200, and the control circuit 600, refer to detailed description in one of the embodiments. Details are not described herein again.

It needs to be noted that, in this embodiment, the self-moving device is set to an along-edge movement mode. The along-edge movement mode may include modes such as along-edge return, performing a task along an edge of the working region 10, and entering a second region from a first region. An objective of this embodiment is to ensure that a movement trajectory of the self-moving device is kept consistent with the boundary 300, to implement accurate along-edge movement. That is, the reference line is controlled to maintain a preset position relationship with the boundary mark during movement, to enable a movement trajectory of the body 100 to have a consistent shape with a boundary. In an embodiment solution, the reference line and the boundary mark are controlled to be parallel or coincident, and a preset distance is kept.

The movement trajectory of the self-moving device may be a movement trajectory of a drive apparatus 700, or may be a movement trajectory of an outer edge of the body 100, or may be a central axis 110 of the movement trajectory of the body 100, or the like. That the movement trajectory of the self-moving device is kept consistent with the boundary 300 refers to that the movement trajectory of the self-moving device is coincident with or parallel to the boundary 300. However, in a movement process of the self-moving device, the drive apparatus 700 remains located in the boundary 300. For example, when the movement trajectory of the drive apparatus 700 is used as the movement trajectory of the self-moving device, the movement trajectory of the drive apparatus 700 remains coincident with the boundary 300 or located in the boundary 300 and parallel to the boundary 300. When the movement trajectory of the outer edge of the body 100 is used as the movement trajectory of the self-moving device, the movement trajectory of the outer edge of the body 100 may be located in the boundary 300 and parallel to the boundary 300, or coincident with the boundary 300, or located outside the boundary 300 and parallel to the boundary 300. When the movement trajectory is located outside the boundary 300 and parallel to the boundary 300, the drive apparatus 700 needs to remain located in the boundary 300, to ensure that the self-moving device does not move outside the boundary 300.

Figure 5:
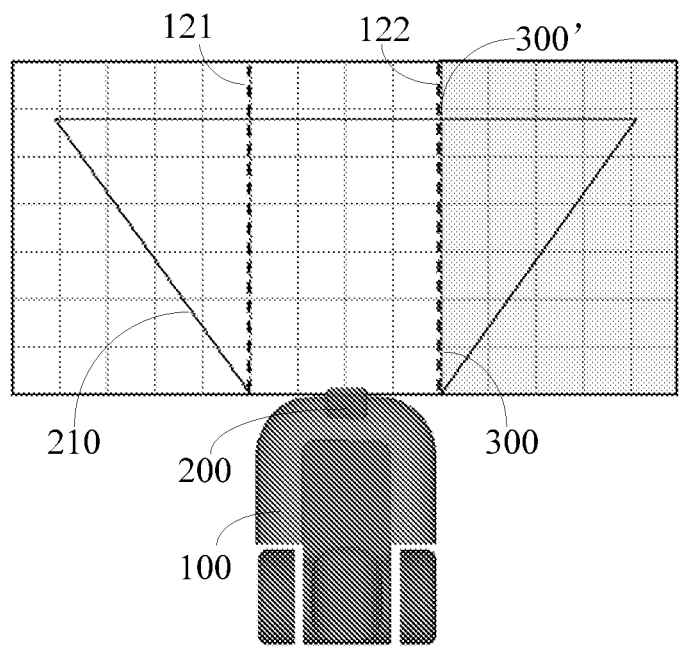
FIG. 5 is a schematic structural diagram of an embodiment when a self-moving device moves along an edge and a boundary is a straight line according to this disclosure.

In this embodiment, the control circuit 600 may fit the traveling direction line on the side of the body 100 close to the boundary 300 by using an image processing technology. The pointing direction of the traveling direction line is consistent with that of the traveling direction of the body 100, and is located on a side of an outer contour of the body 100 close to the boundary 300. For example, a right side of the body 100 is close to the boundary 300, and the traveling direction line used for representing the traveling direction of the body 100 at a right side contour of the body 100 is fit in the image. Referring to FIG. 5, in this embodiment, a second traveling direction line 122 on the right side of the body 100 is used as the traveling direction line on the side of the body 100 close to the boundary 300 is used for description.

When the boundary 300 and the traveling direction line on the side of the body 100 close to the boundary 300 are fit, the movement trajectory of the body 100 may be adjusted in real time according to the position relationship between the two, so that the movement trajectory of the body 100 is kept consistent with the boundary 300.

For the foregoing self-moving device, an image in a traveling direction of the self-moving device is acquired by using the image acquisition module 200 on the body 100, the boundary 300 corresponding to the working region 10 in which the self-moving device is located and the traveling direction line on the side of the body 100 close to the boundary 300 are fit by using the control circuit 600 according to the acquired image, and the movement trajectory of the body 100 is adjusted according to the position relationship between the boundary 300 and the traveling direction line on the side of the body 100 close to the boundary 300, to make the movement trajectory of the body 100 consistent with the boundary 300. That is, in a process of along-edge movement, by using image recognition and processing technologies, the traveling direction line on the side of the body 100 close to the boundary 300 and the boundary 300 may be controlled to keep the preset position relationship, for example, parallel to coincident, to further achieve effect of making the movement trajectory of the body 100 consistent with the boundary 300, thereby implementing accurate along-edge movement.

This embodiment further provides a method for adjusting a movement trajectory, used in a self-moving device. The self-moving device includes a body 100 and an image acquisition module 200 connected to the body 100. The image acquisition module 200 is configured to acquire an image in a traveling direction of the body 100. The method for adjusting a movement trajectory includes the following steps.

Step S200a: Obtain the image in the traveling direction of the body 100.

Step S400a: Fit a boundary 300 corresponding to a working region 10 in which the self-moving device is located and a traveling direction line on a side of the body 100 close to the boundary 300 according to the image.

Step S600a: Adjust a movement trajectory of the body 100 according to a position relationship between the boundary 300 and the traveling direction line on the side of the body 100 close to the boundary 300, to make the movement trajectory of the body 100 consistent with the boundary 300.

For step S200a and step S400a, refer to detailed description in one of the embodiments and corresponding description of the self-moving device provided in this embodiment. Details are not described herein again.

For the foregoing method for adjusting a movement trajectory, an image in a traveling direction of the self-moving device is acquired by using the image acquisition module 200 on the body 100, the boundary 300 corresponding to the working region 10 in which the self-moving device is located and the traveling direction line on the side of the body 100 close to the boundary 300 are fit according to the acquired image, and the movement trajectory of the body 100 is adjusted according to the position relationship between the boundary 300 and the traveling direction line on the side of the body 100 close to the boundary 300, to make the movement trajectory of the body 100 consistent with the boundary 300. That is, in a process of along-edge movement, by using image recognition and processing technologies, the traveling direction line on the side of the body 100 close to the boundary 300 and the boundary 300 may be controlled to keep the preset position relationship, for example, parallel to coincident, to further achieve effect of making the movement trajectory of the body 100 consistent with the boundary 300, thereby implementing accurate along-edge movement.

During actual application, a shape of the boundary 300 is not unique, and there may be various possibilities. For example, the shape is a straight line shape, a curve shape, or another shape. For boundaries 300 with different shapes, this embodiment provides different trajectory adjust strategies.

Figure 6:
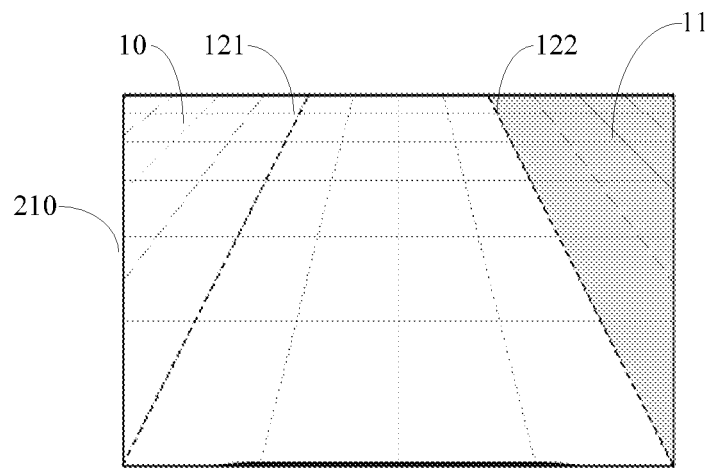
FIG. 6 is a schematic diagram of an embodiment of a field of view range corresponding to FIG. 5.

In one of the embodiments, referring to FIGS. 5 and 6, when the boundary 300 is a straight line, the boundary 300 in FIG. 5 is a boundary that is fitted in the image and is in the field of view range 210. A real boundary 300' is located outside the field of view range 210, and is an actual boundary in the real world.

When the boundary mark is a straight line, the reference line and the boundary mark are controlled to be parallel or coincident, and a preset distance is kept.

Step S600a, that is, the step of adjusting a movement trajectory of the body 100 according to a position relationship between the boundary 300 and the traveling direction line on the side of the body 100 close to the boundary 300, to make the movement trajectory of the body 100 consistent with the boundary 300 includes: adjusting the movement trajectory of the body 100 in real time, to keep the traveling direction line on the side of the body 100 close to the boundary 300 and the boundary 300 coincident or parallel.

That is, when the boundary 300 is a straight line, it is only necessary to adjust the movement trajectory of the body 100 to control the boundary 300 and the traveling direction line on the side of the body 100 close to the boundary 300 to be kept coincident or parallel, and along-edge movement of keeping the movement trajectory consistent with the boundary 300 can be implemented. When the boundary coincides with the traveling direction line, the body 100 moves closely along the boundary 300. When the boundary is parallel to the traveling direction line, the body 100 is located in the boundary and is kept at a fixed distance from the boundary 300. Along-edge movement can be implemented in both the manners.

In this embodiment, it is determined by using an image recognition technology whether the boundary 300 and the traveling direction line on the side of the body 100 close to the boundary 300 are kept coincident or parallel, to further adjust the movement trajectory. Compared with conventional determining a position relationship between the body 100 and the boundary 300 and adjusting a trajectory in a manner of signal detection according to the boundary 300, this manner effectively improves efficiency, and is not prone to errors, so that efficiency of along-edge movement and accuracy of an along-edge movement path are improved.

Figure 7:
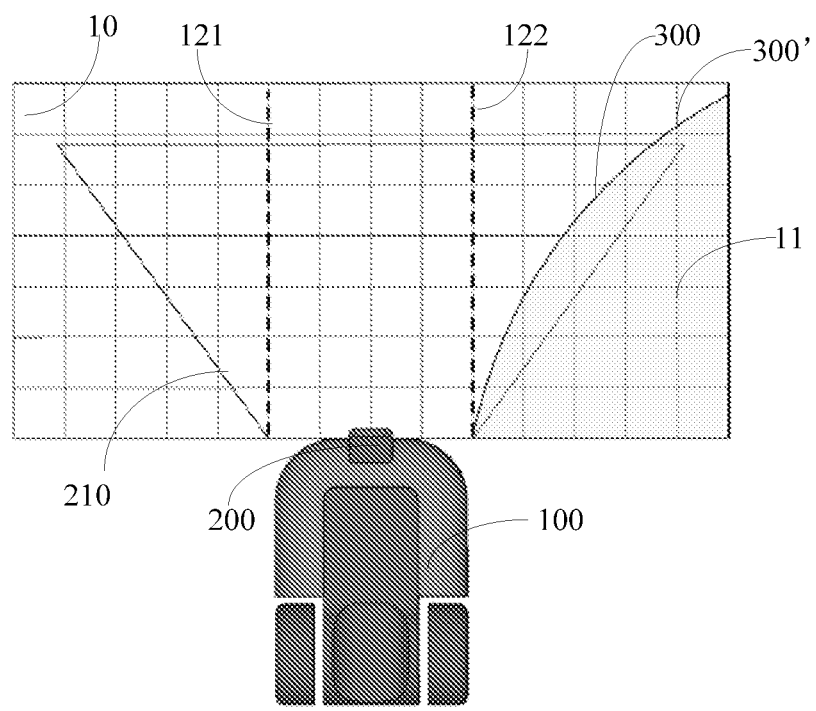
FIG. 7 is a schematic structural diagram of an embodiment when a self-moving device moves along an edge and a boundary is a curve of a structure according to this disclosure.
Figure 8:
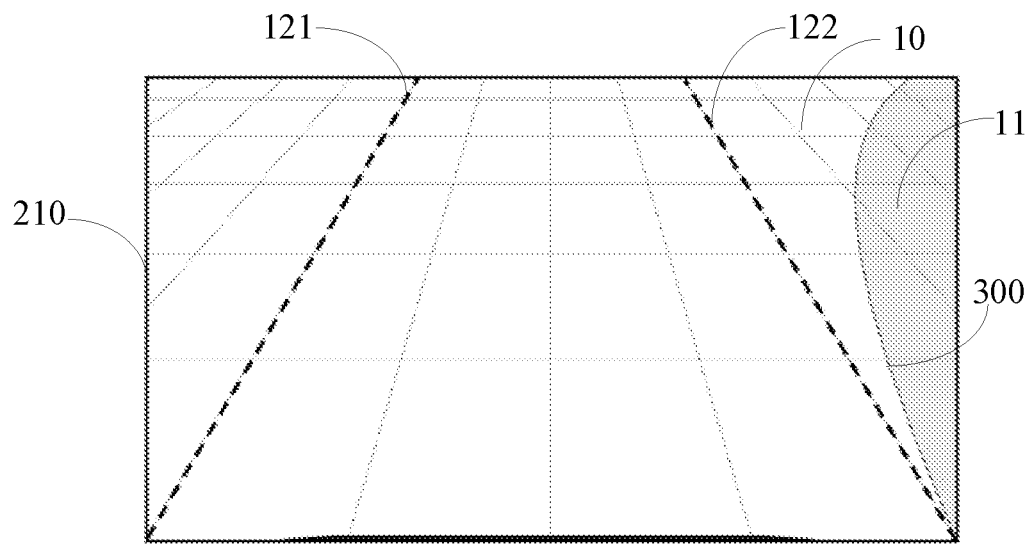
FIG. 8 is a schematic diagram of an embodiment of a field of view range corresponding to FIG. 7.
Figure 9:
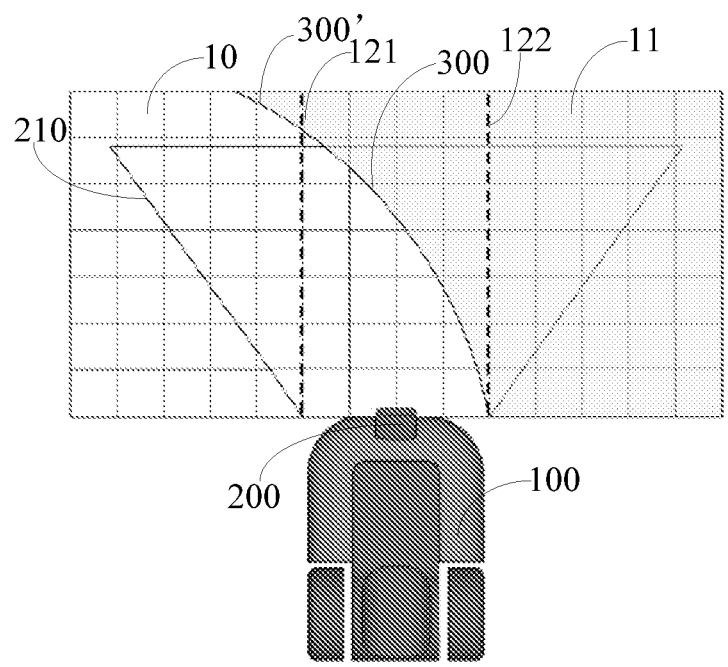
FIG. 9 is a schematic structural diagram of an embodiment when the self-moving device moves along an edge and the boundary is a curve of another structure according to this disclosure.
Figure 10:
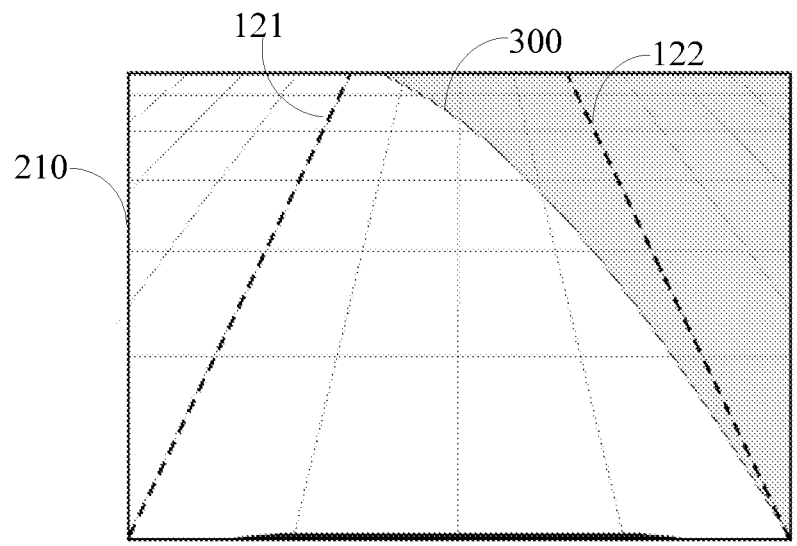
FIG. 10 is a schematic diagram of a field of view range corresponding to FIG. 9.

In one of the embodiments, referring to FIGS. 7 and 10, the boundary 300 is a curve. FIG. 7 and FIG. 8 schematically show that the boundary 300 is a curve bulging toward the working region 10. FIG. 9 and FIG. 10 schematically show that the boundary 300 is a curve bulging toward the non-working region 11. The boundary 300 in FIG. 7 and FIG. 9 is a boundary that is fitted in the image and is in the field of view range 210. A real boundary 300' is located outside the field of view range 210, and is an actual boundary in the real world.

When the boundary mark is a curve, the reference line or a parallel line of the reference line is controlled to be tangential to the boundary mark, and a preset distance is kept.

Step S600a, that is, the step of adjusting a movement trajectory of the body 100 according to a position relationship between the boundary 300 and the traveling direction line on the side of the body 100 close to the boundary 300, to make the movement trajectory of the body 100 consistent with the boundary 300 includes: adjusting the movement trajectory of the body 100 in real time, to keep the traveling direction line on the side of the body 100 close to the boundary 300 tangential to the boundary 300, or a parallel line parallel to the traveling direction line tangential to the boundary 300.

That is, when the boundary 300 is a curve, it is only necessary to adjust the movement trajectory of the body 100 to control the boundary 300 to be kept tangential to the traveling direction line on the side of the body 100 close to the boundary 300, or a parallel line parallel to the traveling direction line to be kept tangential to the boundary 300, and along-edge movement of keeping the movement trajectory consistent with the boundary 300 can be implemented. When the boundary 300 is tangential to the traveling direction line on the side of the body 100 close to the boundary 300, the body 100 moves closely along the boundary 300. When a parallel line parallel to the traveling direction line is tangential to the boundary 300, the body 100 is located in the boundary and is kept at a fixed distance from the boundary 300. Along-edge movement can be implemented in both the manners.

In this embodiment, it is determined by using an image recognition technology whether the boundary 300 is kept tangential to the traveling direction line on the side of the body 100 close to the boundary 300, or whether a parallel line parallel to the traveling direction line is kept tangential to the boundary 300, to further adjust the movement trajectory. Compared with conventional determining a position relationship between the body 100 and the boundary 300 and adjusting a trajectory in a manner of signal detection according to the boundary 300, this manner effectively improves efficiency, and is not prone to errors, so that efficiency of along-edge movement and accuracy of an along-edge movement path are improved.

Figure 12:
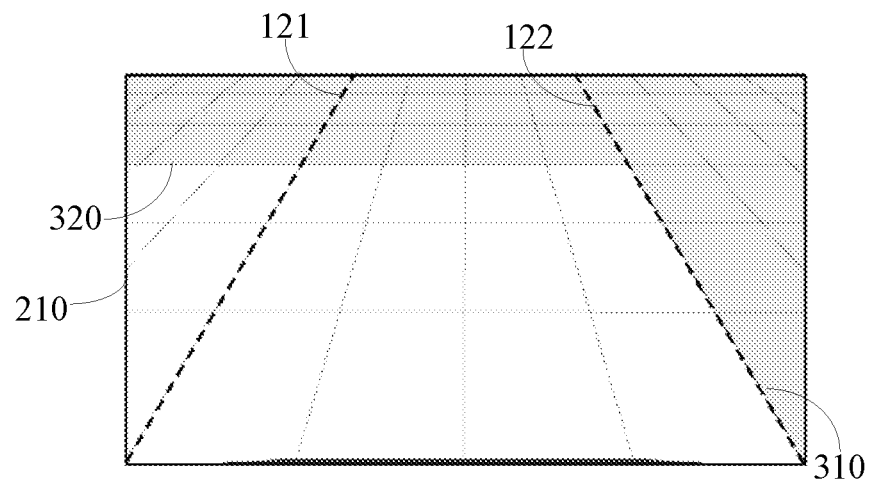
FIG. 12 is a schematic diagram of an embodiment of a field of view range corresponding to FIG. 11.

In one of the embodiments, referring to FIG. 11 and FIG. 12, when the boundary 300 includes a first boundary 310 and a second boundary 320 that intersect, and the first boundary 310 and the second boundary 320 define a corner region bulging away from the working region 10, the body 100 moves along the first boundary 310 and toward the corner region defined by the first boundary 310 and the second boundary 320.

When the boundary mark is a corner facing outward in the traveling direction, the control circuit 600 controls the body 100 to move along a first edge of the corner and keep the reference line and the first edge coincident, or parallel at a preset distance; at the same time, monitors a distance between the self-moving device and a second edge, and when the distance reaches a preset value, controls the self-moving device to steer, until the reference line and the second edge are coincident, or are parallel at the preset distance; and next, controls movement along the second edge of the corner and keeps the reference line and the second edge coincident, or parallel at the preset distance.

Step S600a, that is, the step of adjusting a movement trajectory of the body 100 according to a position relationship between the boundary 300 and the traveling direction line on the side of the body 100 close to the boundary 300, to make the movement trajectory of the body 100 consistent with the boundary 300 includes:

obtaining a distance between the body 100 and the second boundary 320 in real time; and when the distance between the body 100 and the second boundary 320 reaches the preset value, controlling the body 100 to rotate away from the first boundary 310 and toward the second boundary 320, until the traveling direction line on the side of the body 100 close to the boundary 300 and the second boundary 320 are coincident or parallel.

That is, in a process in which the body 100 moves along one side (that is, the first boundary 310) of the corner region and approaches the other side (that is, the second boundary 320) of the corner region, the distance between the body 100 and the second boundary 320 is obtained in real time by using an image recognition technology. The distance between the body 100 and the second boundary 320 may be a distance between a central position point of a front end of the body 100 and a position point of the second boundary 320 closest to the body 100, or may be a distance between another position point on the body 100 and another position point on the second boundary 320, and may be determined according to an actual requirement. When the distance between the body 100 and the second boundary 320 reaches the preset value, that is, the distance between the body 100 and the second boundary 320 reaches a minimum limiting value, and it is not suitable to continue to approach the second boundary 320, the body 100 is controlled to steer, so that the traveling direction line on the side of the body 100 close to the boundary 300 and the second boundary 320 are coincident or parallel, to implement that the body 100 rotates from one side to the other side at a corner, and ensure that the movement trajectory of the body 100 is kept consistent with a trajectory of the boundary 300 at the corner region.

When the traveling direction line on the side of the body 100 close to the boundary 300 coincides with the second boundary 320, that is, the body 100 is controlled to steer and move closely along the second boundary 320. When the traveling direction line on the side of the body 100 close to the boundary 300 is parallel to the second boundary 320, that is, after the body 100 is controlled to steering, the body 100 and the second boundary 320 are kept at a fixed distance. Along-edge movement can be implemented in both the manners.

Figure 13:
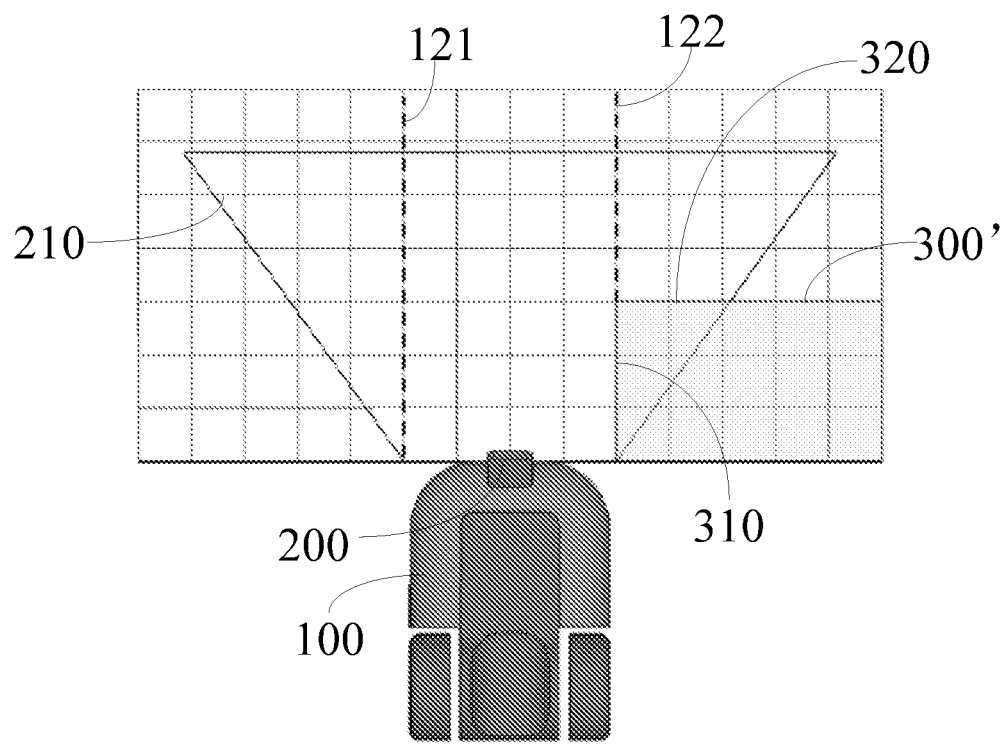
FIG. 13 is a schematic structural diagram of an embodiment when the self-moving device moves along an edge and the boundary is a corner region of another structure according to this disclosure.
Figure 14:
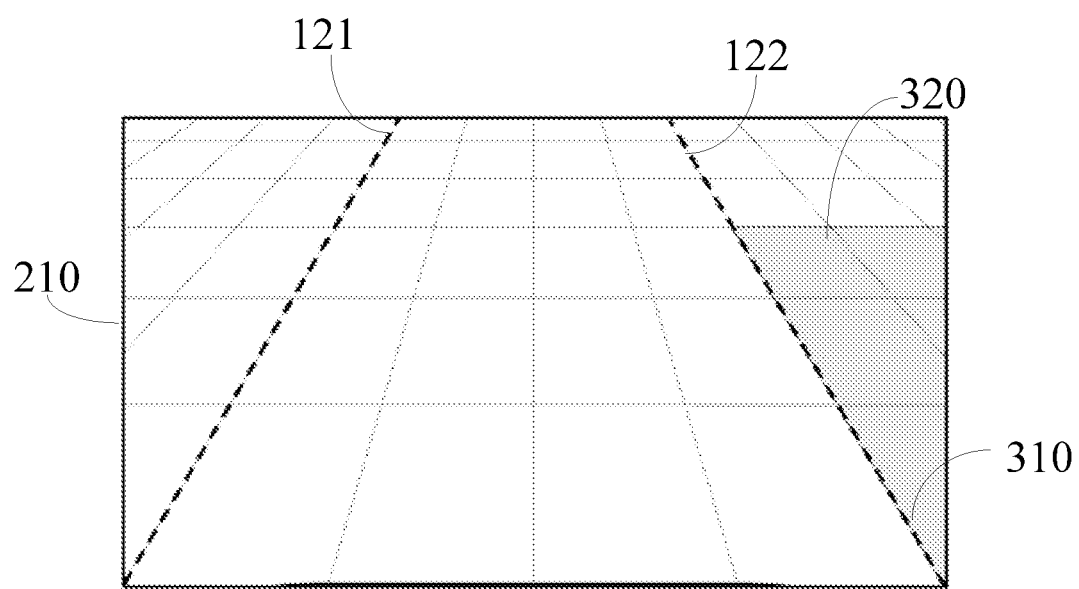
FIG. 14 is a schematic diagram of an embodiment of a field of view range corresponding to FIG. 13.

In one of the embodiments, referring to FIG. 13 and FIG. 14, when the boundary 300 includes the first boundary 310 and the second boundary 320 that intersect, and the first boundary 310 and the second boundary 320 define a corner region bulging toward the working region 10, the body 100 moves along the first boundary 310 and toward the corner region defined by the first boundary 310 and the second boundary 320.

When the boundary mark is a corner facing inward relative to the traveling direction, the control circuit 600 controls the body 100 to move along a first edge of the corner and keeps the reference line and the first edge coincident, or parallel at a preset distance; when the first edge is invisible in the picture, makes the body continue to move until the body has moved the preset distance in the original traveling direction; next, controls the self-moving device to steer, until the reference line and a second edge are coincident, or are parallel at the preset distance; and next, controls movement along the second edge of the corner and keeps the reference line and the second edge coincident, or parallel at the preset distance.

In the foregoing embodiments of moving along an edge, the reference line is an edge line reference line close to a side of the boundary mark.

Step S600a, that is, the step of adjusting a movement trajectory of the body 100 according to a position relationship between the boundary 300 and the traveling direction line on the side of the body 100 close to the boundary 300, to make the movement trajectory of the body 100 consistent with the boundary 300 includes:

controlling the body 100 to keep moving in an extension direction of the first boundary 310, until the body 100 moves beyond the first boundary 310; and controlling the body 100 to rotate toward the second boundary 320, until the traveling direction line on the side of the body 100 close to the boundary 300 and the second boundary 320 are coincident or parallel.

Figure 15:
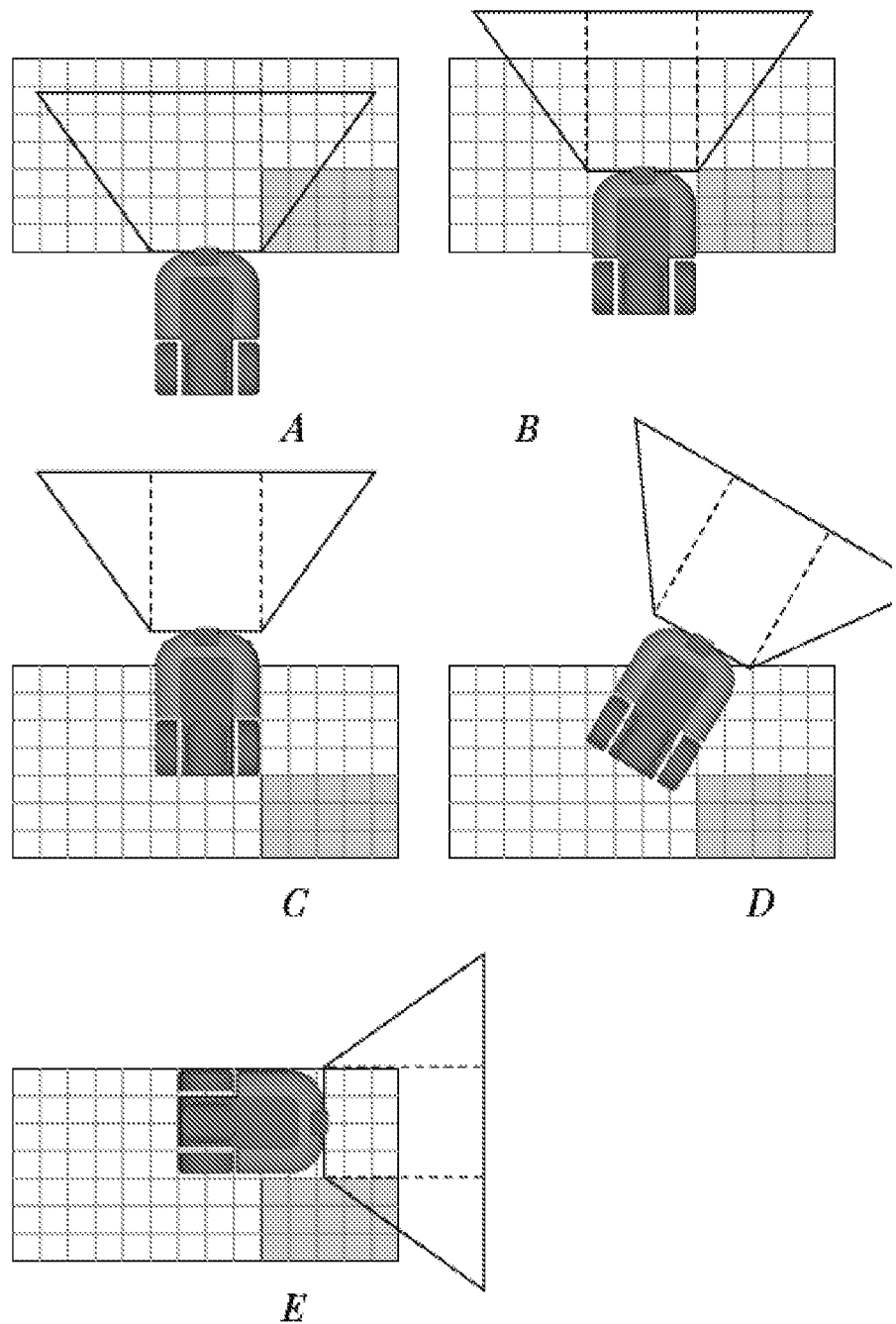
FIG. 15 is an exploded view of an embodiment of a movement process when the self-moving device moves along an edge and the boundary is a corner region of another structure according to this disclosure.

Referring to FIG. 15, when it is recognized by using an image recognition technology that the body 100 is moving along the corner region of the foregoing shape, the body 100 is controlled to move along the first boundary 310 (A in FIG. 15). When the front end of the body 100 moves beyond the first boundary 310, the body 100 continues to be controlled to keep the current traveling direction (B in FIG. 15), until the body 100 completely moves beyond the first boundary 310 (C in FIG. 15). In this case, the body 100 is controlled to steer to the other side of the corner region (D in FIG. 15), that is, the second boundary 320, until it is recognized in the image that the traveling direction line on the side of the body 100 close to the boundary 300 is coincident with or parallel to the second boundary 320, to continue to control the body 100 to move along the second boundary 320 (E in FIG. 15). That is, it is implemented that the body 100 rotates from one side to the other side at the corner of the foregoing shape, and ensures that the movement trajectory of the body 100 is kept consistent with the trajectory of the boundary 300 at the corner region.

When the traveling direction line on the side of the body 100 close to the boundary 300 coincides with the second boundary 320, that is, the body 100 is controlled to steer and move closely along the second boundary 320. When the traveling direction line on the side of the body 100 close to the boundary 300 is parallel to the second boundary 320, that is, after the body 100 is controlled to steering, the body 100 and the second boundary 320 are kept at a fixed distance. Along-edge movement can be implemented in both the manners.

In one of the embodiments, a self-moving device is provided. Referring to FIG. 1, the self-moving device includes a body 100, an image acquisition module 200, and a control circuit 600.

Figure 16:
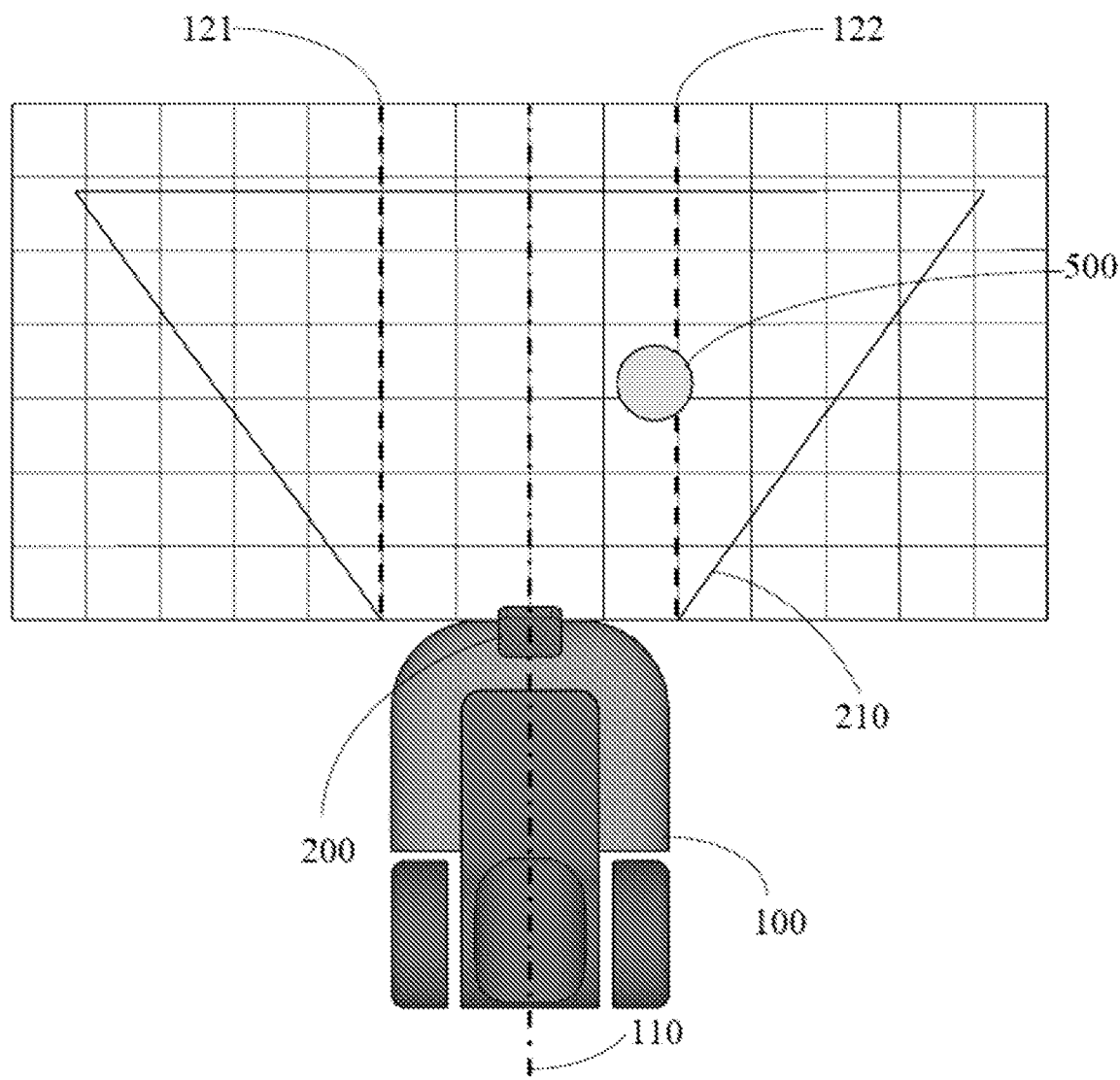
FIG. 16 is a schematic diagram of an embodiment of obstacle avoidance of a self-moving device according to this disclosure.

Reference FIG. 16, the image acquisition module 200 is connected to the body 100, and is configured to acquire an image in a traveling direction of the body 100. The image is located in a field of view range 210 of the image acquisition module 200. The control circuit 600 is connected to the image acquisition module 200, and is configured to: determine whether an obstacle 500 exists in a designated region in the image, and if the obstacle 500 exists, control the body 100 according to a preset rule to steer.

Figure 17:
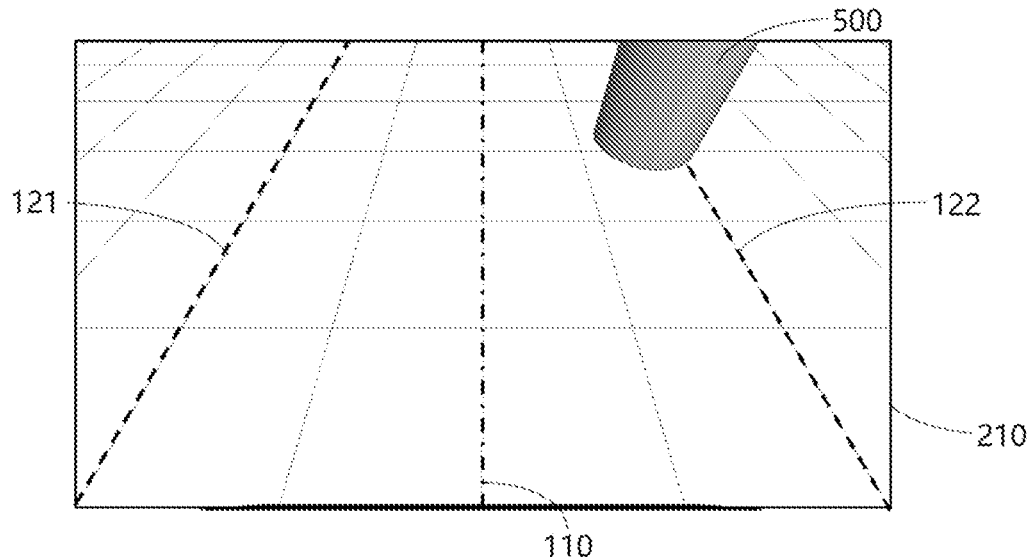
FIG. 17 is a schematic diagram of an embodiment of a field of view range corresponding to FIG. 16.

Reference FIG. 17, specifically, the reference line includes a central axis reference line, a left side edge line reference line, and a right side edge line reference line, and that the control circuit sends the drive instruction according to the obstacle 500 and the reference line includes: when the obstacle mark is located on a left side of the central axis reference line and is at least partially located between the central axis reference line and the left side edge line reference line, sending a control instruction for controlling the self-moving device to steer to the right; and when the obstacle mark is located on a right side of the central axis reference line and is at least partially located between the central axis reference line and the right side edge line reference line, sending a control instruction for controlling the self-moving device to steer to the left. When the obstacle mark is located on the central axis reference line, the self-moving device is controlled to steer randomly.

For the body 100 and the image acquisition module 200, refer to detailed description in one of the embodiments disclosed herein. Details are not described herein again.

It needs to be noted that, in this embodiment, the self-moving device may be in a working mode of working in the working region 10, or may be in an along-edge movement mode. An objective of this embodiment is to ensure that when meeting the obstacle 500 during movement, the self-moving device can accurately and quickly perform obstacle avoidance.

In this embodiment, the control circuit 600 may set the designated region in the image by using an image processing technology, and recognize in a traveling process whether the obstacle 500 exists in the designated region. If the obstacle 500 is recognized, the body 100 is controlled according to the preset rule to steer, to avoid the obstacle 500. Compared with conventional technologies for detecting the obstacle 500, in this embodiment, efficiency of recognizing the obstacle 500 and avoiding the obstacle 500 by using an image recognition technology is higher, and accuracy is higher, so that quick and accurate obstacle avoidance of the self-moving device can be implemented, to improve movement efficiency. In addition, in this embodiment, the obstacle 500 is recognized only in the designated region in the image, and an objective of the recognition is only to recognize the obstacle 500 in a region in which the traveling of the body 100 tends to be affected. Compared with recognition of the obstacle 500 in the entire image, a certain amount of operation can be reduced, and an operation speed can be improved.

This embodiment further provides a method for adjusting a movement trajectory, used in a self-moving device. The self-moving device includes a body 100 and an image acquisition module 200 connected to the body 100. The image acquisition module 200 is configured to acquire an image in a traveling direction of the body 100. The method for adjusting a movement trajectory includes the following steps.

Step S200b: Obtain the image in the traveling direction of the body 100.

Step S400b: Determine whether an obstacle 500 exists in a designated region in the image.

Step S600b: If the obstacle 500 exists, control the body 100 according to a preset rule to steer.

In this embodiment, after the image in the traveling direction of the body 100 is obtained, the designated region in the image may be set by using an image processing technology, and recognize in a traveling process whether the obstacle 500 exists in the designated region. If the obstacle 500 is recognized, the body 100 is controlled according to the preset rule to steer, to avoid the obstacle 500. Compared with conventional technologies for detecting the obstacle 500, in this embodiment, efficiency of recognizing the obstacle 500 and avoiding the obstacle 500 by using an image recognition technology is higher, and accuracy is higher, so that quick and accurate obstacle avoidance of the self-moving device can be implemented, to improve movement efficiency. In addition, the designated region is generally a region in which the traveling direction of the body 100 tends to be affected, in this embodiment, the obstacle 500 is recognized only in the designated region in the image, and an objective of the recognition is only to recognize the obstacle 500 in a region in which the traveling of the body 100 tends to be affected. Compared with recognition of the obstacle 500 in the entire image, a certain amount of operation can be reduced, and an operation speed can be improved.

In one of the embodiments, after step S200b, that is, the step of obtaining the image in the traveling direction of the body 100, the method for adjusting a movement trajectory further includes: determining a first traveling direction line 121 and a second traveling direction line 122 that are located on two sides of the body 100 in the image.

Step S400b, that is, the step of determining whether an obstacle 500 exists in a designated region in the image includes: determining whether the obstacle 500 exists between the first traveling direction line 121 and the second traveling direction line 122 in the image.

Referring to any one of FIG. 3 to FIG. 14, the first traveling direction line 121 and the second traveling direction line 122 on the two sides of the body 100 are the outer contour lines 120 on the two sides of the body 100. An extension direction of the outer contour line 120 is the traveling direction of the body 100, and a width between the outer contour lines 120 on the two sides is equal to a width of the body 100. In step S200b, the first traveling direction line 121 and the second traveling direction line 122 on the two sides of the body 100 may be marked in the obtained image in real time. That is, a region between the first traveling direction line 121 and the second traveling direction line 122 is used as the designated region, and further, it is determined by using an image recognition technology whether the obstacle 500 exists in the region between the first traveling direction line 121 and the second traveling direction line 122 in the image.

The region between the first traveling direction line 121 and the second traveling direction line 122 on the two sides of the body 100 may be understood as a region that is right in front of the body 100 and has an equal width as the body 100. The region is generally a region in which the traveling of the body 100 is most likely to be affected. Therefore, the designated region is set as the region between the first traveling direction line 121 and the second traveling direction line 122, so that targeted obstacle recognition and obstacle avoidance can be implemented, to reduce an amount of operation and improve operation efficiency.

Specifically, when the obstacle 500 appears at different positions in the region between the first traveling direction line 121 and the second traveling direction line 122 on the two sides of the body 100, a corresponding steering control strategy also varies.

In one of the embodiments, the body 100 has a central axis 110. The first traveling direction line 121 and the second traveling direction line 122 are symmetrical with respect to the central axis 110.

The step of controlling the body 100 according to a preset rule to steer in step S600b includes:
  when it is detected that the obstacle 500 exists between the central axis 110 and the first traveling direction line 121, controlling the body 100 to rotate away from the first traveling direction line 121 and toward the second traveling direction line 122.
  when it is detected that the obstacle 500 exists between the central axis 110 and the second traveling direction line 122, controlling the body 100 to rotate away from the second traveling direction line 122 and toward the first traveling direction line 121.

It is assumed that the first traveling direction line 121 and the second traveling direction line 122 are respectively located on a left side and a right side of the central axis 110. When it is recognized that the obstacle 500 exists between the central axis 110 and the first traveling direction line 121 on the left side, the body 100 is controlled to rotate to the right. When it is recognized that the obstacle 500 exists between the central axis 110 and the second traveling direction line 122 on the left side, the body 100 is controlled to rotate to the left.

It needs to be noted that, if the obstacle 500 partially exists between the first traveling direction line 121 and the central axis 110 or between the second traveling direction line 122 and the central axis 110, it may be determined that the obstacle 500 exists.

In one of the embodiments, the step of controlling the body 100 according to the preset rule to steer in step S600b further includes: when it is detected that the obstacle 500 exists on the central axis 110, controlling the body 100 to rotate in any direction. When the obstacle 500 just appears on the central axis 110, in this case, the body 100 may be controlled to rotate in any direction.

As an alternative embodiment, the step of controlling the body 100 according to the preset rule to steer in step S600b further includes: when it is detected that the obstacle 500 exists on the central axis 110, controlling a movement direction of the body 100 according to area proportions of the obstacle 500 on two sides of the central axis 110.

In one of the embodiments, the step of controlling a movement direction of the body 100 according to area proportions of the obstacle 500 on two sides of the central axis 110 includes:
  if the area proportion of the obstacle 500 on a side of the central axis 110 close to the first traveling direction line 121 is greater than the area proportion of the obstacle 500 on a side of the central axis 110 close to the second traveling direction line 122, controlling the body 100 to rotate toward the second traveling direction line 122; and
  if the area proportion of the obstacle 500 on the side of the central axis 110 close to the first traveling direction line 121 is less than the area proportion of the obstacle 500 on the side of the central axis 110 close to the second traveling direction line 122, controlling the body 100 to rotate toward the first traveling direction line 121.

That is, when the obstacle 500 occupies a larger area on a side of the central axis 110, the obstacle 500 has more impact on the central axis 110 on the side, and the body 100 is controlled to rotate toward a side on which the obstacle 500 has less impact.

If the area proportions of the obstacle 500 on the two sides of the central axis 110 are equal, the body may steer at any angle.

In one of the embodiments, before step S600b, that is, the step of controlling the body 100 according to the preset rule to steer, the method for adjusting a movement trajectory further includes:
  obtaining a distance between the body 100 and the obstacle 500 in real time; and
  when the distance between the body 100 and the obstacle 500 reaches a preset value, performing the step of controlling the body 100 according to the preset rule to steer.

During actual application, a distance between a position point on the body 100 and the obstacle 500, for example, a distance between a central position point of a front end of the body 100 and the obstacle 500, may be obtained. When the distance reaches the preset value, that is, the distance reaches a minimum limiting value, it is not suitable to continue to approach. In this case, the body 100 is controlled according to the preset rule to steer.

In one of the embodiments, before step S600b, that is, the step of controlling the body 100 according to the preset rule to steer, the method for adjusting a movement trajectory further includes:
  obtaining stay duration of the obstacle 500 in the image in real time; and
  when the stay duration of the obstacle 500 in the image reaches a preset value, performing the step of controlling the body 100 according to the preset rule to steer.

That is, for the timing of steering, in addition to determining the distance between the body 100 and the obstacle 500, determining may further be performed in combination with the stay duration of the obstacle 500 in the image. If the stay duration of the obstacle 500 in the image reaches the preset value, that is, the obstacle 500 appears in the image for a long time, the body 100 may be controlled according to the preset rule to steer. During the determining of the timing of steering, the distance between the body 100 and the obstacle 500 may be separately determined, or the stay duration of the obstacle 500 in the image may be separately determined. Alternatively, both the distance and the stay duration may be determined, and the body 100 is controlled to steer when both the distance and the stay duration meet conditions.

In one of the embodiments of this application, there is provided an electronic device, including a memory and a processor. The memory and the processor are communicatively connected to each other, and may be connected by a bus or in another embodiment.

The processor may be a central processing unit (CPU). The processor may be another chip such as a general purpose processor, a digital signal processor (DSP), an application-specific integrated circuit (ASIC), a field programmable gate array (FPGA) or another programmable logical device, a discrete gate, a transistor logic device, a discrete hardware component, or the like, or a combination of the various chips above.

As a non-transient computer readable storage medium, the memory may be configured to store a non-transient software program and a non-transient computer executable program and module, for example, the method for adjusting a movement trajectory in the embodiments of the present disclosure. The processor runs the non-transient software program, instruction, and module, to perform various function applications and data processing of the processor, that is, the method for adjusting a movement trajectory.

The memory may include a program storage area and a data storage area. The program storage area may store an operating system and an application program required by at least one function. The data storage area may store data and the like created by the processor. In addition, the memory may include a high-speed random access memory, and may also include a non-transient memory, for example, at least one magnetic disk storage device, a flash memory, or another non-transient solid-state storage device. In some embodiments, the memory optionally includes memories remotely disposed relative to the processor, and the remote memories may be connected to the processor through a network. Examples of the network include, but are not limited to, the Internet, an intranet, a local area network, a mobile communication network, and a combination thereof.

A person skilled in the art may understand that all or some of the processes of the methods in the embodiments may be implemented by a computer program instructing relevant hardware. The program may be stored in a computer readable storage medium. When the program is executed, the procedures of the foregoing method embodiments are performed. The storage medium may include a magnetic disk, an optical disc, a read-only memory (ROM), a random access memory (RAM), a flash memory, a hard disk drive (HRR), a solid-state drive (SSD), or the like. The storage medium may further include a combination of the foregoing types of memories.

The technical features in the foregoing embodiments may be randomly combined. For concise description, not all possible combinations of the technical features in the embodiments are described. However, provided that combinations of the technical features do not conflict with each other, the combinations of the technical features are considered as falling within the scope described in this specification.

The foregoing embodiments only describe several embodiments of the present invention, which are described specifically and in detail, but cannot be construed as a limitation to the patent scope of the present invention. It should be noted that for a person of ordinary skill in the art, several transformations and improvements can be made without departing from the idea of the present invention. These transformations and improvements belong to the protection scope of the present invention. Therefore, the protection scope of the patent of the present invention shall be subject to the appended claims.

What is claimed is:

1. A self-moving device comprising:
   a body;
   a drive apparatus configured to drive the self-moving device according to a drive instruction to move in a working plane;
   an image acquisition module connected to the body and configured to continuously acquire an image of the working plane in a traveling direction of the body when the self-moving device moves; and
   a control circuit configured to:
      recognize a feature in a current image and generate a boundary mark that maps a boundary position in the working plane and/or an obstacle mark of an obstacle position in a picture;
      provide a reference line correlated with the traveling direction of the body to the picture; and
      send the drive instruction according to a relative position relationship between the boundary mark and the reference line, and/or a relative position relationship between the obstacle mark and the reference line, to control a movement trajectory of the self-moving device, the reference line including a transverse reference line and a central axis reference line, wherein sending the drive instruction according to the relative position relationship between the boundary mark and the reference line and/or the relative position relationship between the obstacle mark and the reference line includes:
         in response to determining that a distance between the boundary mark and the transverse reference line or a distance between the boundary mark and a reference point, the reference point being on the transverse reference line, meets a preset distance relationship, sending a drive instruction to control the body to perform a steering operation, so that a first acute angle or a right angle is formed between the central axis reference line and a first boundary portion when the steering operation starts, and a second acute angle or the right angle is formed between the central axis reference line and a second boundary portion when the steering operation is completed, wherein an intersection of the central axis reference line and the boundary mark divides the boundary mark into the first boundary portion and the second boundary portion.

2. The self-moving device according to claim 1, wherein:
   the central axis reference line maps a projection of a central axis of the body onto the working plane;
   the transverse reference line maps a projection of a perpendicular of the central axis onto the working plane; and
   the reference line correlated with the traveling direction of the body further comprises:
   at least one of an edge line reference line that maps a projection of a width edge line of the body parallel to the central axis onto the working plane, and a second reference line that maps a parallel line that is located between the central axis and an edge line and is parallel to the central axis or a parallel line that is located between the central axis and an outer edge line and is parallel to the outer edge line.

3. The self-moving device according to claim 2, wherein the controlling the movement trajectory of the self-moving device comprises:
   controlling the reference line to maintain a preset position relationship with the boundary mark during movement, to enable a movement trajectory of the body to have a consistent shape with a boundary.

4. The self-moving device according to claim 3, wherein the controlling the reference line to maintain the preset position relationship with the boundary mark during movement comprises:

in response to determining that the boundary mark is a straight line, controlling the reference line and the boundary mark to be parallel or coincident, and keeping a preset distance.

5. A method for adjusting a movement trajectory of a self-moving device, the method comprising:
   obtaining a continuous image of a working plane in a traveling direction of a body of the self-moving device;
   recognizing a feature in a current image and generating a boundary mark that maps a boundary position in the working plane and/or an obstacle mark of an obstacle position in a picture;
   providing a reference line correlated with the traveling direction of the body to the picture;
   sending a drive instruction to the self-moving device according to a relative position relationship between the boundary mark and the reference line, and/or a relative position relationship between the obstacle mark and the reference line; and
   controlling the movement trajectory of the self-moving device, the controlling the movement trajectory of the self-moving device including, in response to determining that the boundary mark is a corner facing outward in the traveling direction, controlling the reference line to maintain a preset position relationship with the boundary mark during movement, the controlling the reference line to maintain the preset position relationship with the boundary mark during movement including:
     moving along a first edge of the corner and keeping the reference line and the first edge coincident, or parallel at a preset distance;
     monitoring a distance between the self-moving device and a second edge;
     in response to determining that the distance reaches a preset value, controlling the self-moving device to steer, until the reference line and the second edge are coincident, or are parallel at the preset distance; and
     moving along the second edge of the corner and keeping the reference line and the second edge coincident, or parallel at the preset distance.

6. The method according to claim 5, wherein the reference line of the traveling direction of the body comprises:
   at least one of a central axis reference line that maps a projection of a central axis of the body onto the working plane, an edge line reference line that maps a projection of a width edge line of the body parallel to the central axis onto the working plane, and a second reference line that maps a parallel line that is located between the central axis and an edge line and is parallel to the central axis or a parallel line that is located between the central axis and an outer edge line and is parallel to the outer edge line.

7. The method according to claim 6, further comprising: recognizing the relative position relationship according to an angle between the central axis reference line and the boundary mark.

8. The method according to claim 6, wherein a steering angle of the body is greater than α and is less than or equal to α+90°, and α is an acute angle or a right angle formed between the central axis reference line and the boundary mark.

9. The method according to claim 6, further comprising recognizing the relative position relationship according to a side that is of the central axis reference line and on which a lowest point of the boundary mark is located.

10. The method according to claim 9, wherein the sending the drive instruction according to the relative position relationship between the boundary mark and the reference line, and/or the relative position relationship between the obstacle mark and the reference line including:
    in response to a lowest point of the boundary mark is located on a left side of the central axis reference line, sending a drive instruction for controlling the body to rotate clockwise; and in response to the lowest point of the boundary mark is located on a right side of the central axis reference line, sending a control instruction for controlling the body to rotate counterclockwise.

11. The method according to claim 6, wherein the sending the drive instruction according to the relative position relationship between the boundary mark and the reference line, and/or the relative position relationship between the obstacle mark and the reference line including:
    in response to determining that a distance between the reference line, the reference line including a transverse reference line and the central axis reference line, and a reference point on the transverse reference line or the transverse reference line and the boundary mark meets a preset distance relationship, sending a drive instruction to control the body to perform a steering operation, so that a first acute angle or a right angle is formed between the central axis reference line and a first boundary portion when the steering operation starts, and a second acute angle or the right angle is formed between the central axis reference line and a second boundary portion when the steering operation is completed, wherein an intersection of the central axis reference line and the boundary mark divides the boundary mark into the first boundary portion and the second boundary portion.

12. The method according to claim 6, wherein the controlling the reference line to maintain the preset position relationship comprises:
    controlling the reference line to maintain the preset position relationship with the boundary mark during movement, to enable a movement trajectory of the body to have a consistent shape with a boundary.

13. The method according to claim 12, wherein the controlling the reference line to maintain the preset position relationship with the boundary mark during movement comprises:
    in response to determining that the boundary mark is a straight line, controlling the reference line and the boundary mark to be parallel or coincident, and keeping a preset distance.

14. The method according to claim 12, wherein the controlling the reference line to maintain a preset position relationship with the boundary mark during movement comprises:
    in response to the boundary mark is a curve, controlling the reference line or a parallel line of the reference line to be tangential to the boundary mark, and keeping a preset distance.

15. The method according to claim 12, wherein the reference line is a second edge line reference line close to a side of the boundary mark.

16. The method according to claim 5, wherein the reference line comprises a central axis reference line, a left side edge line reference line, and a right side edge line reference line, and the sending the drive instruction according to the relative position relationship between the boundary mark and the reference line, and/or the relative position relationship between the obstacle mark and the reference line comprises:

in response to the obstacle mark is located on a left side of the central axis reference line and is at least partially located between the central axis reference line and the left side edge line reference line, sending a control instruction for controlling the self-moving device to steer to right; and in response to the obstacle mark is located on a right side of the central axis reference line and is at least partially located between the central axis reference line and the right side edge line reference line, sending a control instruction for controlling the self-moving device to steer to left.

17. The method according to claim 16, wherein the sending the drive instruction according to the relative position relationship between the boundary mark and the reference line, and/or the relative position relationship between the obstacle mark and the reference line further comprises:

in response to the obstacle mark is located on the central axis reference line, controlling the self-moving device to steer randomly.

18. The method according to claim 5, wherein the self-moving device is a lawn-mower, and the recognizing the feature in the current image and generating the boundary mark that maps the boundary position in the working plane comprises:

recognizing a grass region and a non-grass region in an image, and fitting a boundary portion between the grass region and the non-grass region into the boundary mark in the picture.

19. A self-moving device comprising:

a body;

a drive apparatus configured to drive the self-moving device according to a drive instruction to move in a working plane;

an image acquisition module connected to the body and configured to continuously acquire an image of the working plane in a traveling direction of the body when the self-moving device moves; and a control circuit configured to:

recognize a feature in a current image and generate a boundary mark that maps a boundary position in the working plane and/or an obstacle mark of an obstacle position in a picture;

provide a reference line correlated with the traveling direction of the body to the picture;

send the drive instruction according to a relative position relationship between the boundary mark and the reference line, and/or a relative position relationship between the obstacle mark and the reference line; and control a movement trajectory of the self-moving device, wherein controlling the movement trajectory of the self-moving device including, in response to determining that the boundary mark is a corner facing inward relative to the traveling direction, controlling the reference line to maintain a preset position relationship with the boundary mark during movement, the controlling the reference line to maintain the preset position relationship with the boundary mark during movement includes:

moving along a first edge of the corner and keeping the reference line and the first edge coincident, or parallel at a preset distance;

in response to the first edge is invisible in the picture, continuing to move until the body has moved the preset distance in an original traveling direction;

controlling the self-moving device to steer, until the reference line and a second edge are coincident, or are parallel at the preset distance; and moving along the second edge of the corner and keeping the reference line and the second edge coincident, or parallel at the preset distance.

\* \* \* \* \*